United States Patent
Hashimoto

(10) Patent No.: US 11,036,628 B2
(45) Date of Patent: Jun. 15, 2021

(54) STORAGE SYSTEM HAVING A HOST DIRECTLY MANAGE PHYSICAL DATA LOCATIONS OF STORAGE DEVICE

(71) Applicant: Toshiba Memory Corporation, Tokyo (JP)

(72) Inventor: Daisuke Hashimoto, Cupertino, CA (US)

(73) Assignee: TOSHIBA MEMORY CORPORATION, Tokyo (JP)

( * ) Notice: Subject to any disclaimer, the term of this patent is extended or adjusted under 35 U.S.C. 154(b) by 0 days.

(21) Appl. No.: 16/588,438

(22) Filed: Sep. 30, 2019

(65) Prior Publication Data

US 2020/0034287 A1    Jan. 30, 2020

Related U.S. Application Data

(63) Continuation of application No. 15/063,311, filed on Mar. 7, 2016, now abandoned.
(Continued)

(51) Int. Cl.
  *G06F 11/14*  (2006.01)
  *G06F 12/02*  (2006.01)
  *G06F 3/06*   (2006.01)

(52) U.S. Cl.
  CPC ........ *G06F 12/0246* (2013.01); *G06F 3/0643* (2013.01); *G06F 3/0638* (2013.01);
  (Continued)

(58) Field of Classification Search
  None
  See application file for complete search history.

(56) References Cited

U.S. PATENT DOCUMENTS 7,873,782 B2   1/2011  Terry et al.
8,032,724 B1  10/2011  Smith
(Continued)

FOREIGN PATENT DOCUMENTS

JP   2012-203864 A   10/2012
JP   2014-026635 A    2/2014
(Continued)

OTHER PUBLICATIONS

U.S. Appl. No. 15/065,496, filed Mar. 9, 2016.
(Continued)

*Primary Examiner* — Brian R Peugh
(74) *Attorney, Agent, or Firm* — Kim & Stewart LLP

(57) ABSTRACT

A storage system includes a host including a processor and a memory unit, and a storage device including a controller and a non-volatile memory unit. The processor is configured to output a write command, write data, and size information of the write data, to the storage device, the write command that is output not including a write address. The controller is configured to determine a physical write location of the non-volatile memory unit in which the write data are to be written, based on the write command and the size information, write the write data in the physical write location of the non-volatile memory unit, and output the physical write location to the host. The processor is further configured generate, in the memory unit, mapping information between an identifier of the write data and the physical write location.

20 Claims, 34 Drawing Sheets

Related U.S. Application Data

(60) Provisional application No. 62/153,655, filed on Apr. 28, 2015.

(52) U.S. Cl.
CPC .. *G06F 11/1456* (2013.01); *G06F 2212/1028* (2013.01); *G06F 2212/1044* (2013.01); *G06F 2212/7201* (2013.01); *G06F 2212/7208* (2013.01); *Y02D 10/00* (2018.01)

(56) References Cited

U.S. PATENT DOCUMENTS

| | | | |
|---|---|---|---|
| 8,041,878 | B2 | 10/2011 | Lee |
| 8,363,349 | B2 | 1/2013 | Haga et al. |
| 8,364,918 | B1 | 1/2013 | Smith |
| 8,539,315 | B2 | 9/2013 | Hashimoto |
| 8,631,191 | B2 | 1/2014 | Hashimoto |
| 8,751,727 | B2 * | 6/2014 | Kawamura ........... G06F 3/0679 711/103 |
| 8,769,191 | B2 | 7/2014 | Yun et al. |
| 8,874,872 | B2 | 10/2014 | Feldman et al. |
| 8,935,302 | B2 | 1/2015 | Flynn et al. |
| 8,984,375 | B2 | 3/2015 | Hashimoto |
| 9,026,734 | B2 | 5/2015 | Hashimoto |
| 9,026,764 | B2 | 5/2015 | Hashimoto |
| 9,053,007 | B2 | 6/2015 | Nishikubo |
| 9,329,991 | B2 | 5/2016 | Cohen et al. |
| 10,459,664 | B1 * | 10/2019 | Dreier ................ G06F 11/1458 |
| 2011/0113194 | A1 | 5/2011 | Terry et al. |
| 2013/0238638 | A1 | 9/2013 | Fukutomi et al. |
| 2014/0115283 | A1 * | 4/2014 | Radovic ................ G06F 11/00 711/162 |
| 2014/0215129 | A1 | 7/2014 | Kuzmin et al. |
| 2014/0365719 | A1 | 12/2014 | Kuzmin et al. |
| 2015/0074371 | A1 | 3/2015 | Hashlmoto et al. |
| 2015/0089179 | A1 | 3/2015 | Kurita et al. |
| 2015/0143032 | A1 | 5/2015 | Hashimoto |
| 2015/0331624 | A1 | 11/2015 | Law |
| 2015/0347025 | A1 | 12/2015 | Law |
| 2016/0034354 | A1 | 2/2016 | Hashmoto et al. |
| 2016/0092123 | A1 | 3/2016 | Kumar et al. |

FOREIGN PATENT DOCUMENTS

| | | |
|---|---|---|
| WO | 2014039845 A1 | 3/2014 |
| WO | 2014039922 A2 | 3/2014 |
| WO | 2014147865 A1 | 9/2014 |

OTHER PUBLICATIONS

U.S. Appl. No. 15/015,047, filed Feb. 3, 2016.
Young-Sik Lee et al., "OSSD: A Case for Object-Based Solid State Drives", MSST 2013, 43 pages.
Matias Bjorling, "Open-Channel Solid State Drives", Vault, Mar. 12, 2015, 22 pages.
Matias Bjorling, "Linux Kernel Abstractions for Open-Channel Solid State Drives", Non-Volatile Memories Workshop, Mar. 1, 2015, 10 pages.
NVM Express, Revision 1.2, Nov. 3, 2014, 205 pages.
Storage Intelligence Proposal, Revision 6, Mar. 10, 2015, 56 pages.
Shin-Ichi Kanno et al., "Theoretical Write Amplification Analysis of the SSD", Technical Report of IEICE, Oct. 10, 2014, 2 pages.
Andrea C. Arpaci-Dusseau et al., "Removing the Costs of Indirection in Flash-Based SSDs with Nameless Writes", USENIX HotStorage 2010, Jun. 22, 2010, 32 pages.
Yiying Zhang et al, "De-indirection for Flash-Based SSDs with Nameless Writes", USENIX FAST 2012, Feb. 7, 2012, 16 pages.
Robert E. Novak, "ZFS on SMR Drives, Enabling Shingled Magnetic Recording (SMR) for Enterprises", Jun. 2, 2014, 26 pages.
Chao Jin et al., "HiSMRFs—A File System for Shingled Storage Array", MSST 2014, Jun. 5, 2014, 23 pages.
Chao Jin et al., "HiSMRFs: A High Performance File System for Shingled Storage Array", IEEE, 2014, 6 pages.
Abutalib Aghayev et al., "Skylight—A Window on Shingled Disk Operation", USENIX FAST 2015, Feb. 17, 2015, 46 pages.
Mary Dunn, "Shingled Magnetic Recording Models, Standardization, and Applications", SNIA Education, 2014, 44 pages.

* cited by examiner

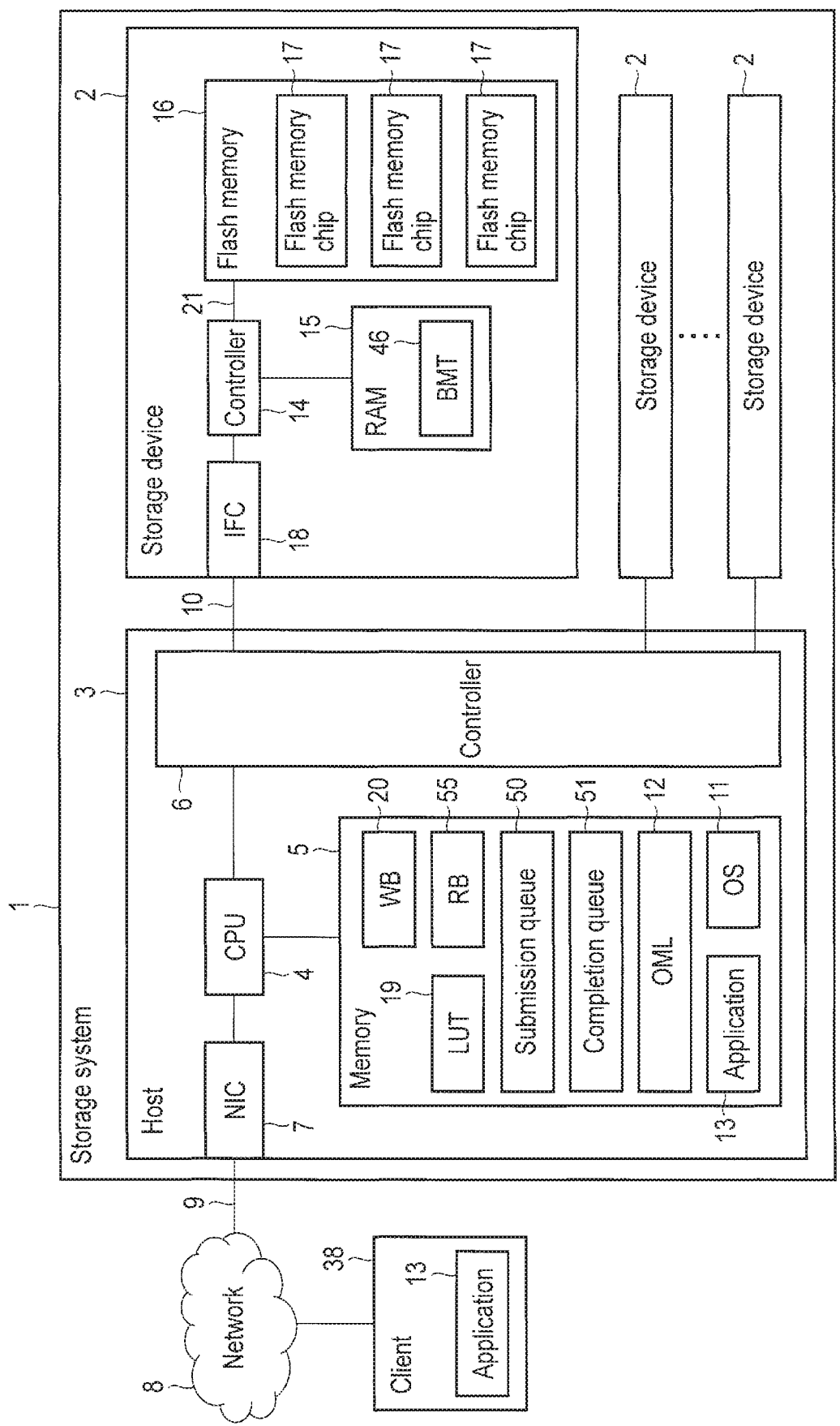
F I G. 1

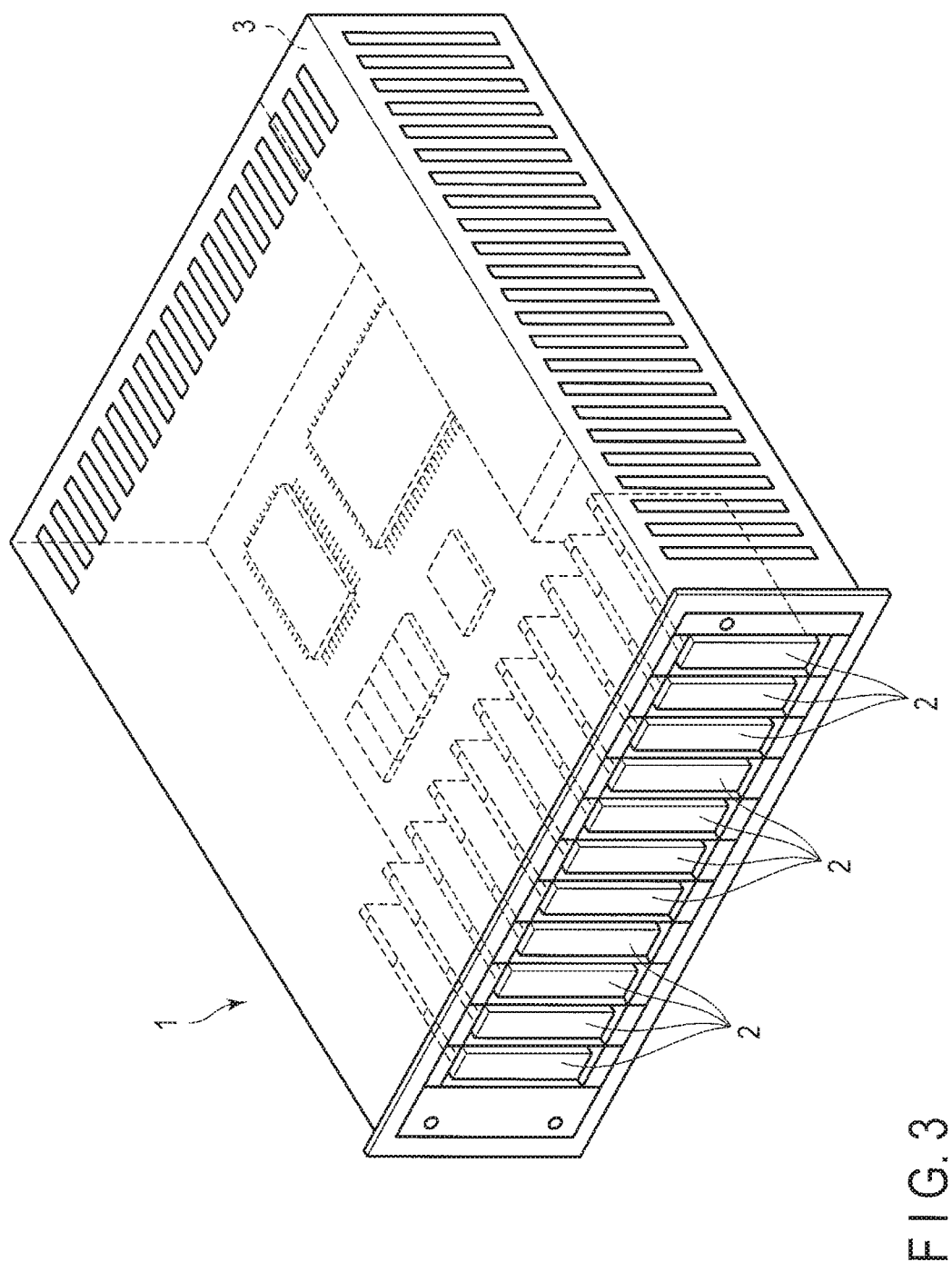
F I G. 3

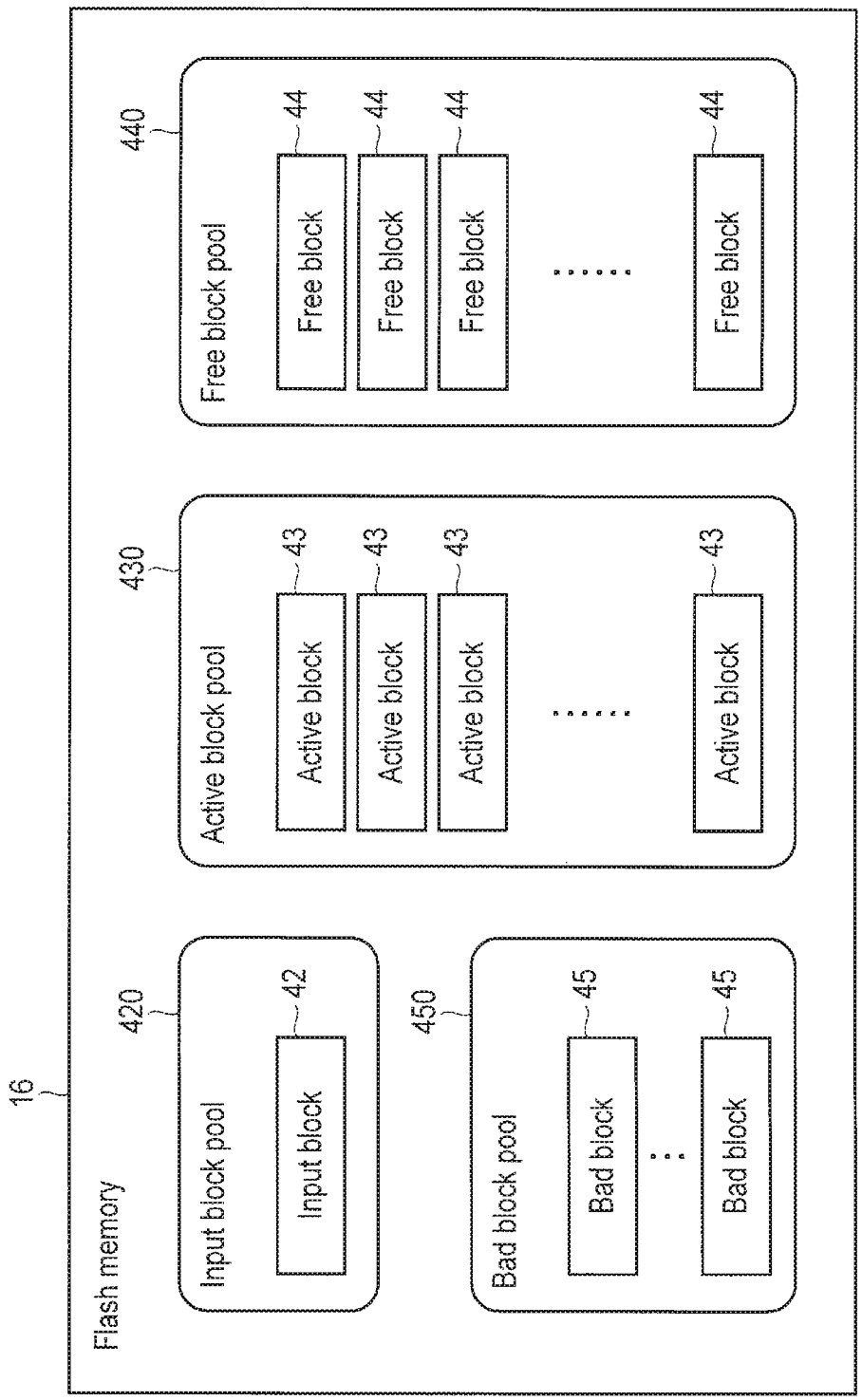
F I G. 11

Block mapping table 46

Free block table 461

| Block address | Erase count |
|---|---|
| ... | ... |
| ... | ... |
| ... | ... |
| ... | ... |

Active block table 462

| Block address | Erase count |
|---|---|
| ... | ... |
| ... | ... |
| ... | ... |
| ... | ... |

Bad block table 463

| Block address | Erase count |
|---|---|
| ... | ... |
| ... | ... |
| ... | ... |
| ... | ... |

Input block table 464

| Block address | Page address to be written | Erase count |
|---|---|---|
| ... | ... | ... |
| ... | ... | ... |
| ... | ... | ... |
| ... | ... | ... |

F I G. 12

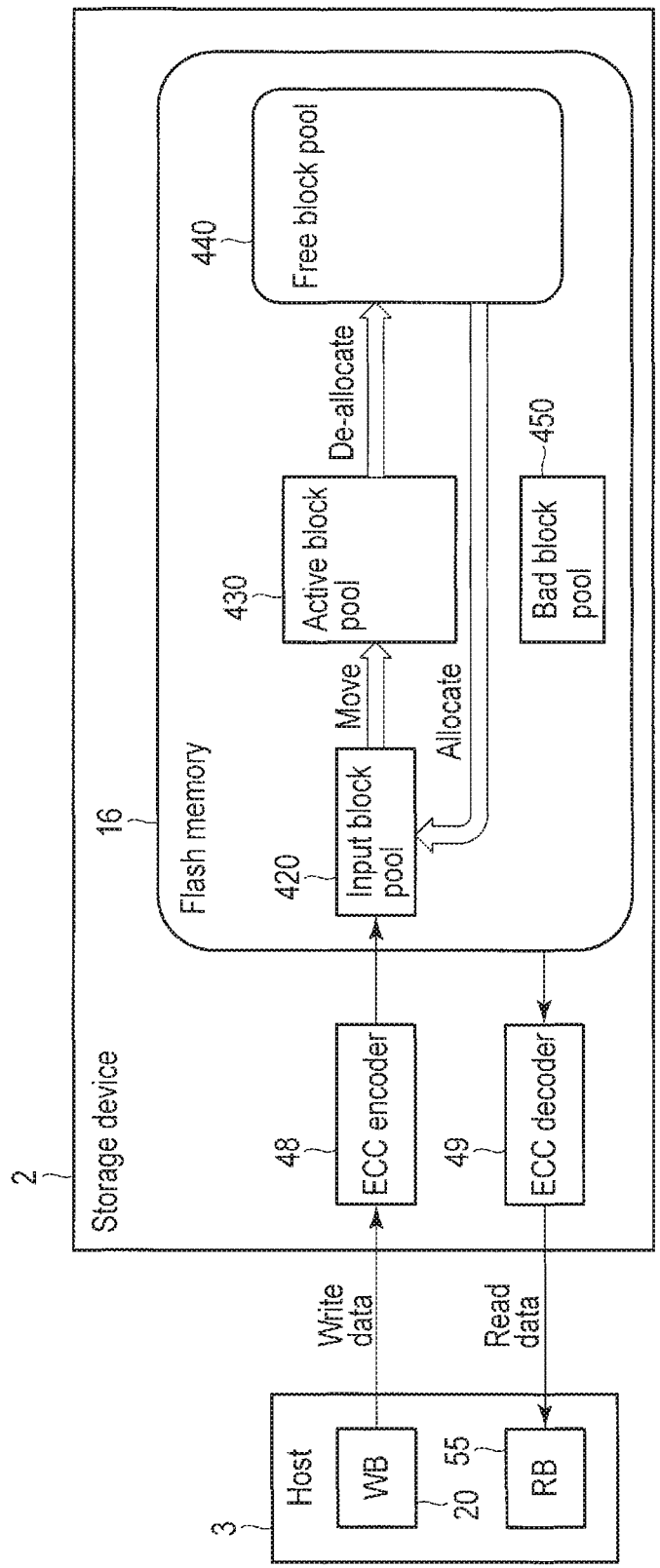
F I G. 14

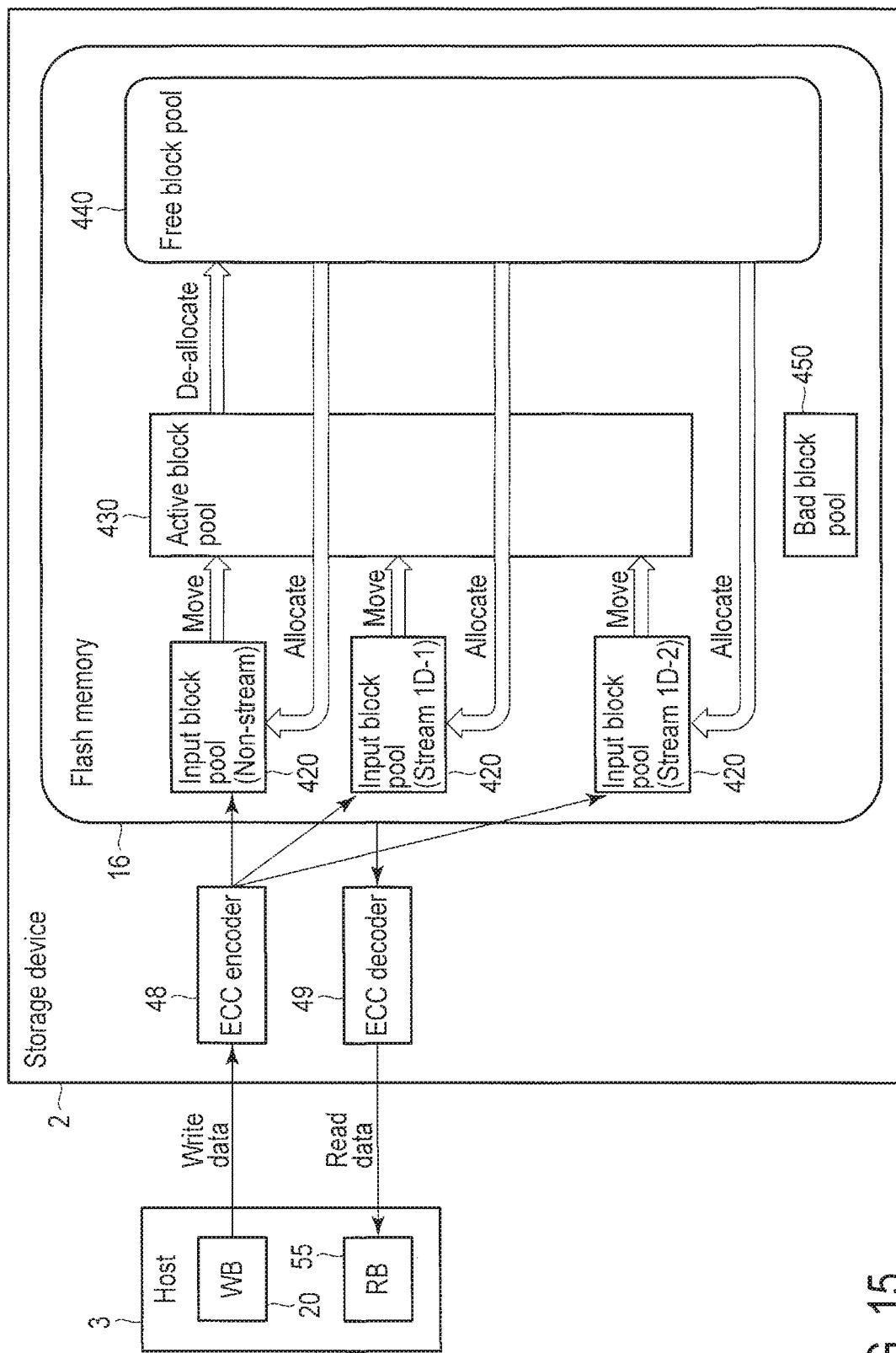
F I G. 15

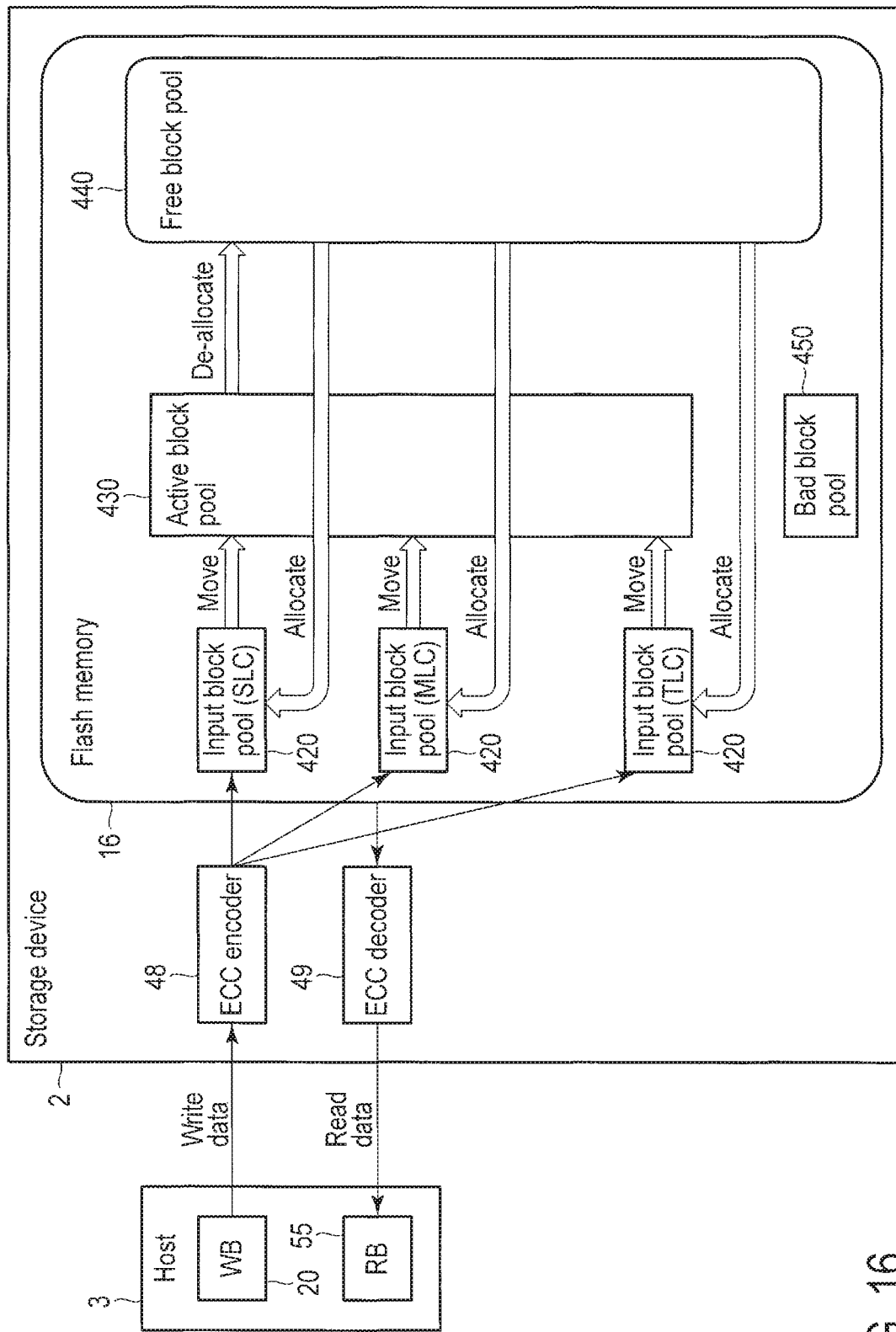
F I G. 16

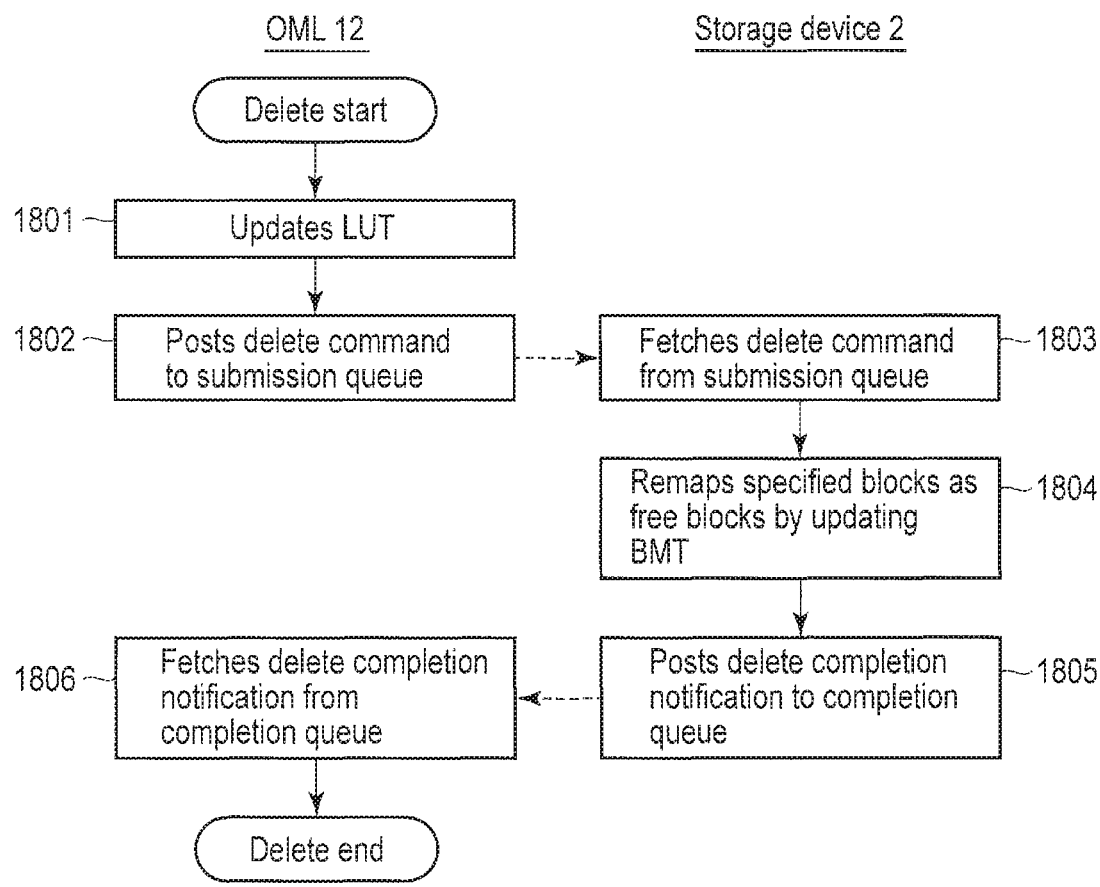
F I G. 18

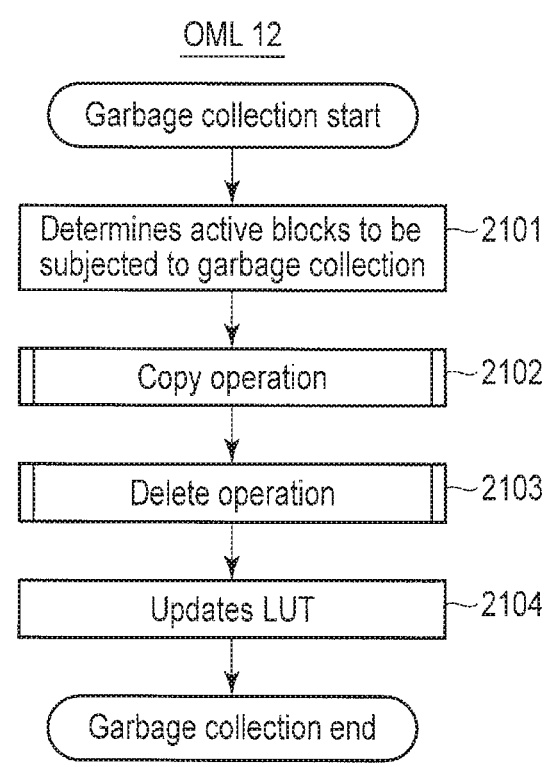
F I G. 21

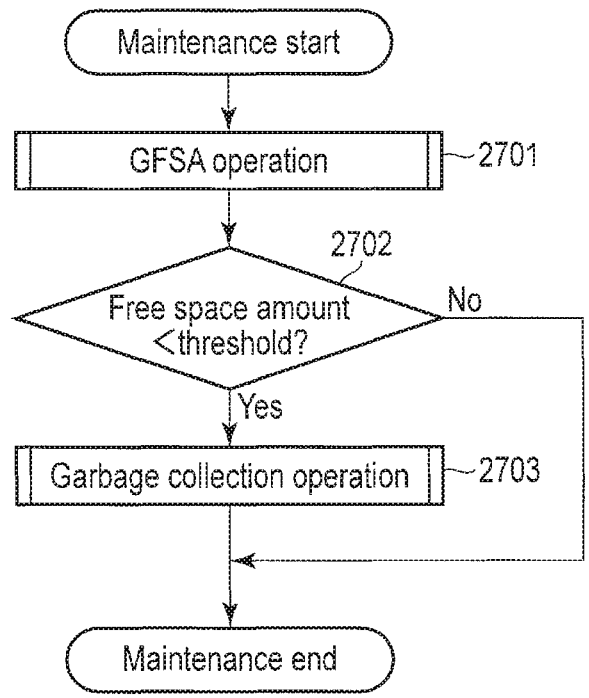
F I G. 27

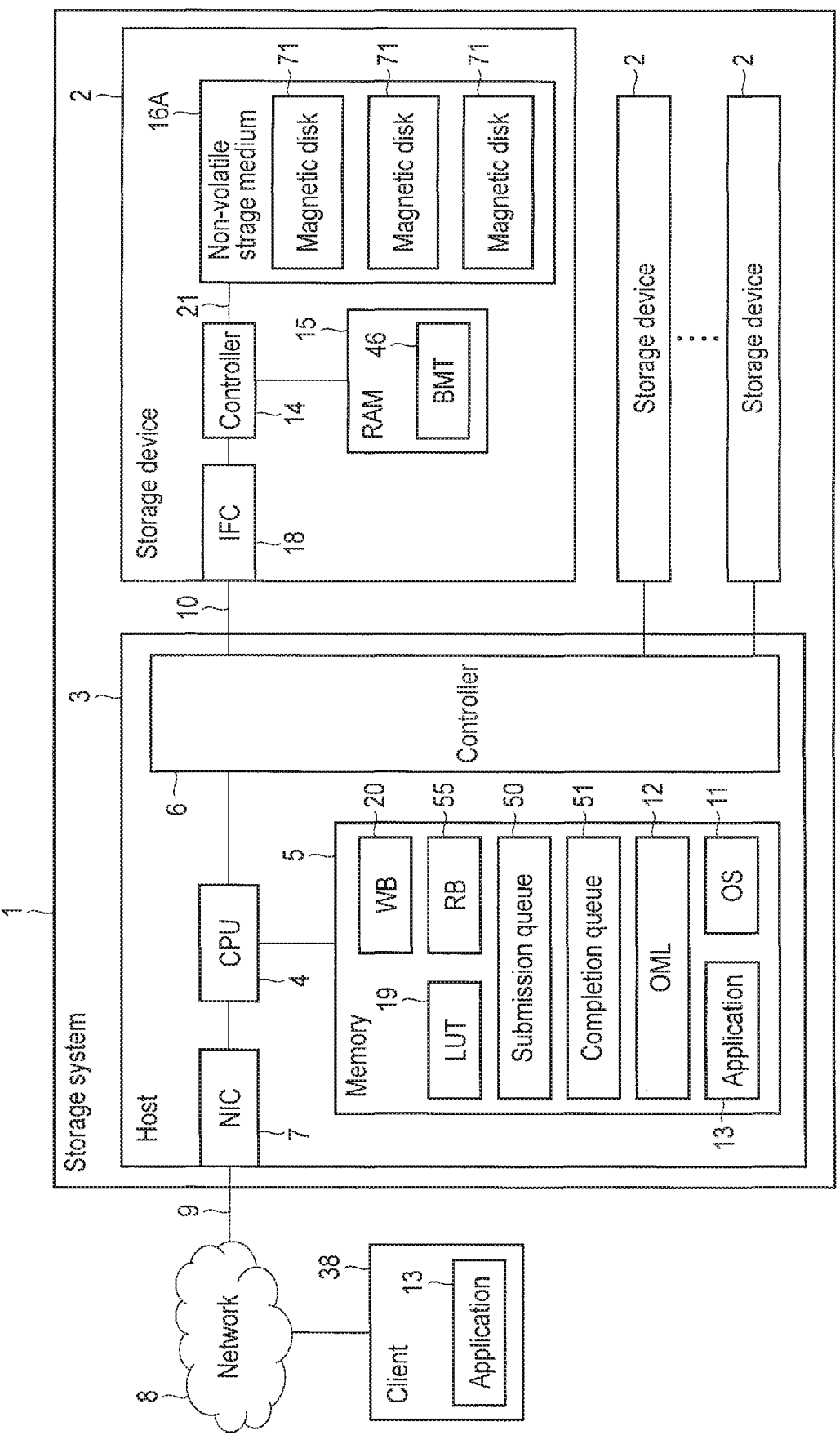
F I G. 28

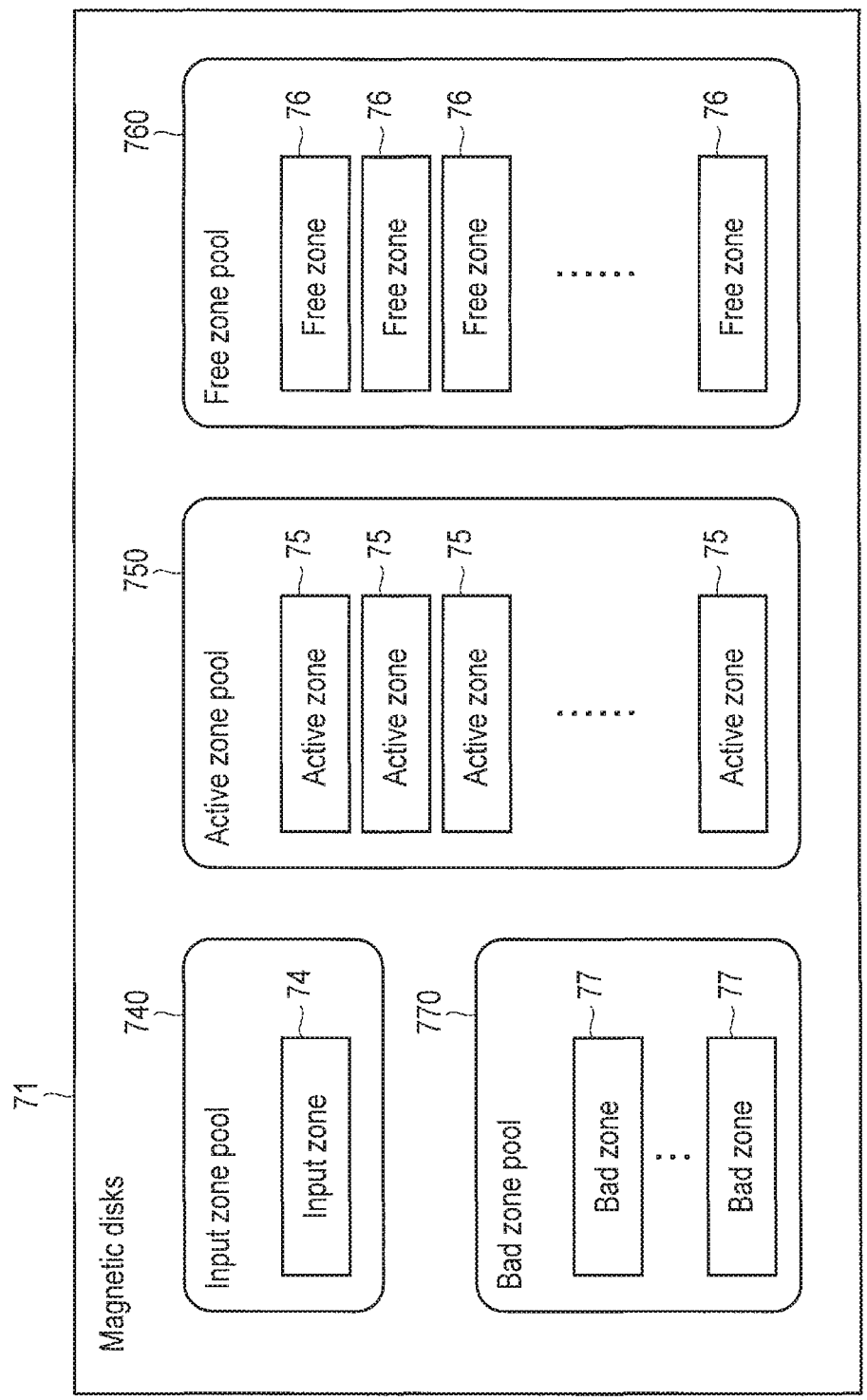
F I G. 30

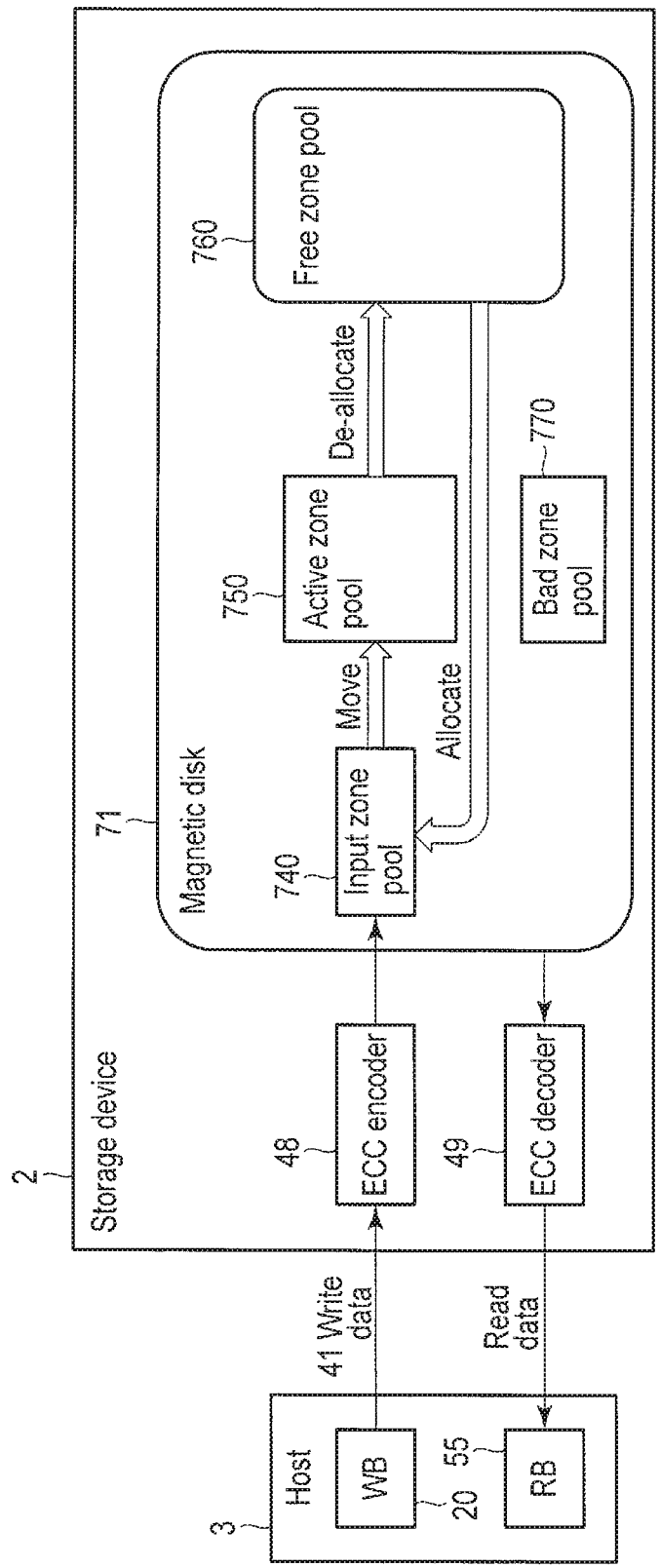
F I G. 31

STORAGE SYSTEM HAVING A HOST DIRECTLY MANAGE PHYSICAL DATA LOCATIONS OF STORAGE DEVICE

CROSS-REFERENCE TO RELATED APPLICATIONS

This application is a continuation of U.S. patent application Ser. No. 15/063,311, filed on Mar. 7, 2016, which is based upon and claims the benefit of priority from U.S. Provisional Patent Application No. 62/153,655, filed on Apr. 28, 2015, the entire contents of each of which are incorporated herein by reference.

FIELD

Embodiments described here relate generally to a storage system operating based on commands, in particular, a storage system having a host directly manage physical data locations of a storage device.

BACKGROUND

A storage device includes a controller and a non-volatile memory. The controller receives a write command and write data and writes the write data to the non-volatile memory.

BRIEF DESCRIPTION OF THE DRAWING

FIG. 1 is a block diagram of a storage system of a first embodiment.

FIG. 3 is a transparent view of the storage system according to the first embodiment.

FIG. 11 illustrates an overview of mapping of physical blocks based on block pools according to the first embodiment.

FIG. 12 illustrates a block mapping table according to the first embodiment.

FIG. 14 schematically illustrates a first example of an architecture overview of the write operation performed in the storage device according to the first embodiment.

FIG. 15 schematically illustrates a second example of the architecture overview of the write operation performed in the storage device according to the first embodiment.

FIG. 16 schematically illustrates a third example of the architecture overview of the write operation performed in the storage device according to the first embodiment.

FIG. 18 is a flowchart of a delete operation according to the first embodiment.

FIG. 21 is a flowchart of a garbage collection operation according to the first embodiment.

FIG. 27 is a flowchart of a maintenance operation according to the first embodiment.

FIG. 28 is a block diagram of a storage system according to a second embodiment.

FIG. 30 illustrates an overview of mapping of zones based on zone pools of the second embodiment.

FIG. 31 schematically illustrates an architecture overview of a write operation performed in the storage system according to the second embodiment.

DETAILED DESCRIPTION

Figure 2:
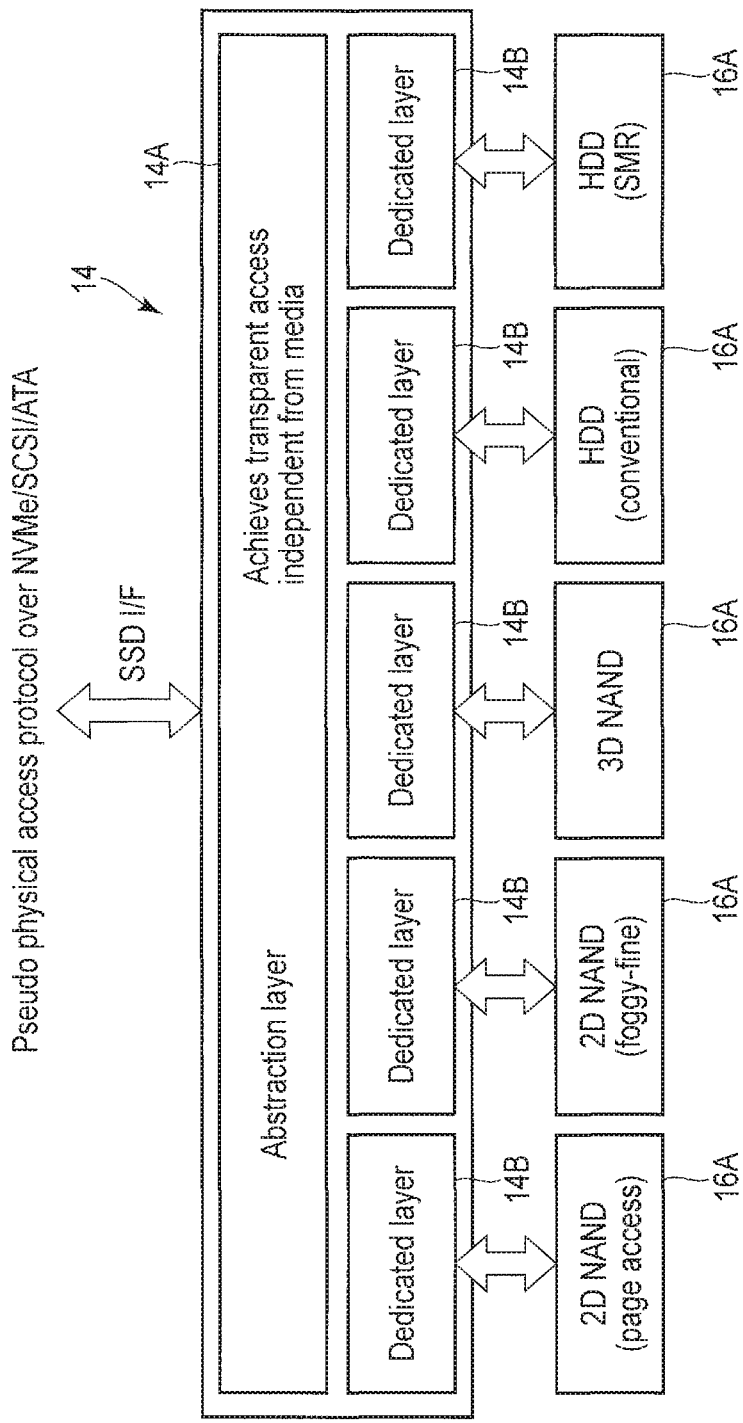
FIG. 2 is a block diagram of a storage device in the storage system, which shows an example of a relationship between a non-volatile memory and a controller including a front end and a back end.

In general, according to an embodiment, a storage system includes a host including a processor and a memory unit, and a storage device including a controller and a non-volatile memory unit. The processor is configured to output a write command, write data, and size information of the write data, to the storage device, the write command that is output not including a write address. The controller is configured to determine a physical write location of the non-volatile memory unit in which the write data are to be written, based on the write command and the size information, write the write data in the physical write location of the non-volatile memory unit, and output the physical write location to the host. The processor is further configured generate, in the memory unit, mapping information between an identifier of the write data and the physical write location.

Various embodiments will be described hereinafter with reference to the accompanying drawings. In the description below, approximately-same functions and composition elements are represented by the same reference numbers and overlapping descriptions are provided if necessary.

First Embodiment

In a first embodiment, a storage system including a host and a storage device is described. The host is an example of a processing device. In the present embodiment, the storage device is, for example, a solid-state drive (SSD), which is a non-volatile storage device. Alternatively, the storage device can include other storage devices such as a hard disk drive (HDD), a hybrid drive, an SD card, a universal serial bus (USB) flash drive, an embedded multimedia card (eMMC), and a memory node.

The storage device in the present embodiment does not have a flash translation layer (FTL) which manages mapping information between a logical address such as a logical block address (LBA) and a physical address. In contrast, the host manages a lookup table (LUT) including information in which data identification information such as an object ID and a file name is associated with a physical address in the storage device. The LUT is an example of management data.

FIG. 1 is a block diagram of a storage system according to the first embodiment. In the present embodiment, a storage system 1 is communicably connected to a client (client device) 38 via a network 8. The storage system 1 includes a host (host device) 3, one or more storage devices 2, and an interface 10 connecting the host 3 and each of the storage devices 2.

The host 3 includes a central processing unit (CPU) 4, a memory 5, a controller 6, and a network interface controller (NIC) 7. The CPU 4 is an example of a processor. The memory 5 is an example of a storage module.

The NIC 7 performs transmission and reception of data, information, signals, commands, addresses and the like to and from an external device such as the client 38 via a network interface 9. The network interface 9 uses a protocol such as, for example, Ethernet, InfiniBand, Fiber Channel, Peripheral Component Interconnect Express (PCIe) Fabric, Wireless Fidelity (Wi-Fi), or the like.

The CPU 4 is included in the host 3, and performs various calculations and control operations in the host 3. The CPU 4 executes, for example, an operating system (OS) 11 loaded from one of the storage devices 2 to the memory 5.

The CPU 4 is connected to the controller 6 by an interface using a protocol such as PCI Express. The CPU 4 performs controls of the storage devices 2 via the controller 6.

The controller 6 controls each storage device 2 in accordance with instructions of the CPU 4. The controller 6 is a PCIe Switch in the present embodiment, but a serial attached SCSI (SAS) expander, PCIe expander, RAID controller, JBOD controller, or the like may be used as the controller 6.

The memory 5 temporarily stores a program and data and functions as an operational memory of the CPU 4. The memory 5 includes, for example, a dynamic random access memory (DRAM), a magnetoresistive random access memory (MRAM), a resistive random access memory (ReRAM), and a ferroelectric random access memory (FeRAM).

The memory 5 includes a write buffer memory 20, a read buffer memory 55, an LUT 19, a submission queue 50, a completion queue 51, a storage area for storing the OS 11, a storage area for storing an object management layer (OML) 12, and a storage area for storing an application software layer 13.

The write buffer memory 20 temporarily stores write data.
The read buffer memory 55 temporarily stores read data.
The LUT 19 is used to manage mapping between object IDs and physical addresses of a flash memory 16 and the write buffer memory 20.

The submission queue 50 stores, for example, a command or request to the CPU 4 or a command or request to the storage devices 2.

When the command or request transmitted to the storage devices 2 is completed, the completion queue 51 stores information indicating completion of the command or request and information related to the completion.

The OS 11 is a program for managing the entire host 3, and operates to manage an input to and an output from the host 3, the storage devices 2, and the memory 5, and enable software to use components in the storage system 1, including the storage devices 2.

The OML 12 controls a manner of data writing to the storage device 2 and data reading from the storage device 2. The OML 12 employs, for example, an object storage system. Alternatively, the OML 12 may employ a file system and a key value store system.

The application software layer 13 transmits to the storage device 2 a request, such as a put request or a get request, which is initiated by the host 3 and/or the client 38.

The storage devices 2 communicate with the host 3 via the interface 10. In the present embodiment, the interface 10 uses the PCIe protocol as a lower protocol layer and an NVM Express protocol as an upper protocol layer. Alternatively, the interface 10 can use any other technically feasible protocol, such as SAS, USB, serial advanced technology attachment (SATA), Fiber Channel, or the like.

The storage device 2, which functions as an SSD, includes a controller 14, a random access memory (RAM) 15, a non-volatile semiconductor memory, such as a NAND flash memory 16 (hereinafter flash memory), and an interface controller (IFC) 18.

The controller 14 manages and controls the flash memory 16, the RAM 15, and the IFC 18. The controller 14 manages physical blocks of the flash memory 16 by managing a block mapping table (BMT) 46 including a free block table, an active block table, a bad block table, and an input block table. The BMT 46 manages physical block address lists of input blocks, active blocks, free blocks, and bad blocks, respectively.

The RAM 15 may be a semiconductor memory, and includes an area storing the BMT 46 for managing mapping of the physical block address and managing a page address of an input block to be written.

The RAM 15 may be, for example, a volatile RAM, such as a DRAM and a static random access memory (SRAM), or a non-volatile RAM, such as a FeRAM, an MRAM, a phase-change random access memory (PRAM), and a ReRAM. The RAM 15 may be embedded in the controller 14.

The flash memory 16 includes one or more flash memory chips 17 and stores user data designated by the host 3 in one or more of the flash memory chips 17. The controller 14 and the flash memory 16 are connected via a flash memory interface 21, such as Toggle and ONFI.

The IFC 18 performs transmission and reception of signals to and from the host 3 via the interface 10.

In the present embodiment, the flash memory 16 is employed as a non-volatile storage medium of the storage device 2, but other type of storage medium such as spinning disk of HDD can be employed.

FIG. 2 is a block diagram of the storage device, which shows an example of a relationship between the non-volatile storage medium and the controller 14 including a front end and a back end.

The controller 14 includes, for example, an abstraction layer 14A corresponding to the front end and at least one dedicated layer 14B corresponding to the back end. In the present embodiment, the controller 14 of storage device 2 does not have the FTL which manages mapping information between the logical address such as the LBA and the physical address such as the physical block address (PBA).

The abstraction layer 14A manages blocks (or zones) of the non-volatile storage medium 16A such as the flash memory 16 and processes commands from the host 3. For example, the abstraction layer 14A manages block mapping of four types of blocks, i.e., a free bock, an active block, a bad block, and an input block, based on a physical address abstracted by the dedicated layer 14B.

The dedicated layer 14B performs control dedicated to a corresponding non-volatile storage medium 16A and transmission and reception of commands to and from the non-volatile storage medium 16A. For example, the dedicated layer 14B controls the non-volatile storage medium 16A such as the flash memory 16 and performs transmission and reception of commands to and from the non-volatile storage medium 16A. The non-volatile storage medium 16A is not limited to a flash memory 16 and may be a different type of non-volatile storage medium 16A. For example, the non-volatile storage medium 16A may be a 2D NAND memory of page access, a 2D NAND memory of foggy-fine access, a 3D NAND memory, an HDD, a shingled magnetic recording (SMR) HDD, or their combination.

FIG. 3 is a transparent view of the storage system 1 according to the first embodiment. As the storage system 1, for example, the host 3 and the storage devices 2 provided adjacent to the host 3 are accommodated in an enclosure (case) having a shape of a rectangular parallelepiped.

Figure 4:
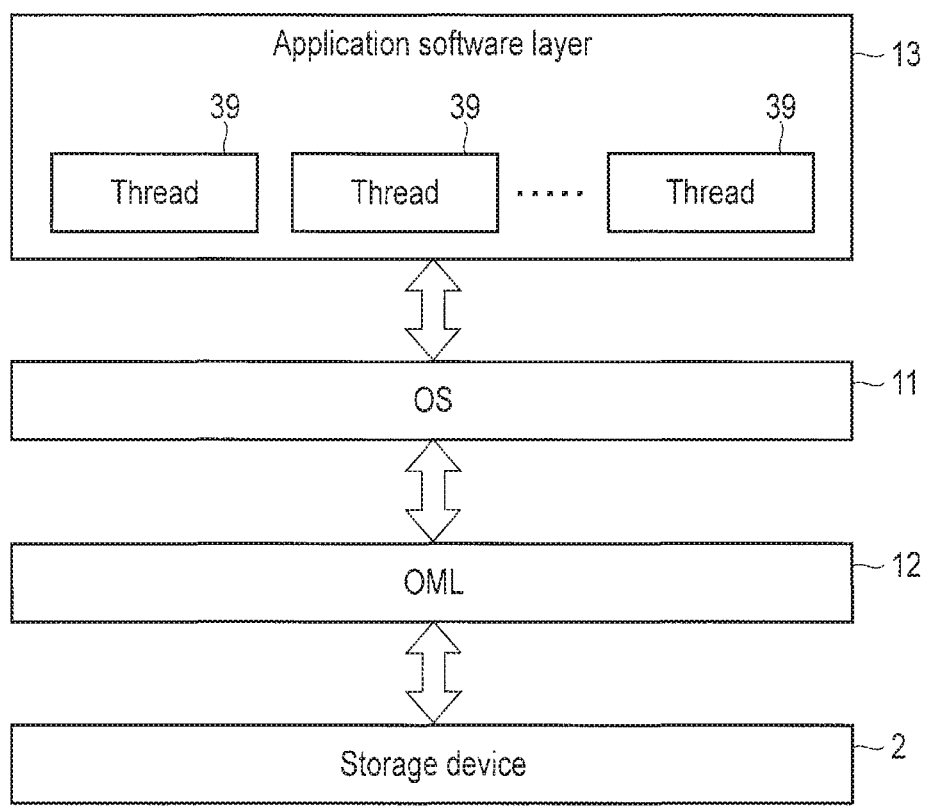
FIG. 4 illustrates a software layer structure of the storage system according to the first embodiment.

FIG. 4 illustrates an example of a software layer structure of the storage system 1 according to the first embodiment.

In the application software layer 13 loaded in the memory 5 and/or the client 38, a variety of application software threads 39 run. The application software threads 39 may include, for example, client software, database software, a distributed storage system, a virtual machine (VM), a guest OS, and analytics software.

The application software layer 13 communicates with the storage device 2 through the OS 11 and the OML 12 loaded in the memory 5. When the application software layer 13 transmits to the storage device 2 a request, such as a put request or a get request, which is initiated by the host 3 and/or the client 38, the application software layer 13 first transmits the request to the OS 11, and then the OS 11 transmits the request to the OML 12.

The OML 12 specifies one or more physical addresses of the storage device 2 corresponding to the request, and then transmits a command, the one or more physical addresses, and data associated with the one or more physical addresses, to the storage device 2 via the interface 10.

Upon receiving a response from the storage device 2, the OML 12 transmits a response to the OS 11, and then the OS 11 transmits the response to the application software layer 13.

For example, in a write operation, the application software layer 13 transmits a write command, an object ID, and write data, to the OS 11. The OS 11 transmits the write command, the object ID, and the write data, to the OML 12. The OML 12 transmits the write command, the write data, and size information of the write data to the storage device 2 without performing address translation. The controller 14 of the storage device 2 writes the write data to the flash memory 16 and transmits a write address in which the write data are written to the OML 12. The OML 12 associates the object ID with the write address, updates the LUT 19, and transmits a response to the OS 11. The OS 11 transmits the response to the application software layer 13.

For example, in a read operation, the application software layer 13 transmits a read command and an object ID to the OS 11. Then, the OS 11 transmits the read command and the object ID to the OML 12. The OML 12 converts the object ID to a read address by referring to the LUT 19 and transmits the read command and the read address to the storage device 2. The controller 14 of the storage device 2 reads data (read data) corresponding to the read address from the flash memory 16 and transmits the read data to the OML 12. Then, the OML 12 transmits the read data to the OS 11. The OS 11 transmits the read data to the application software layer 13.

Figure 5:
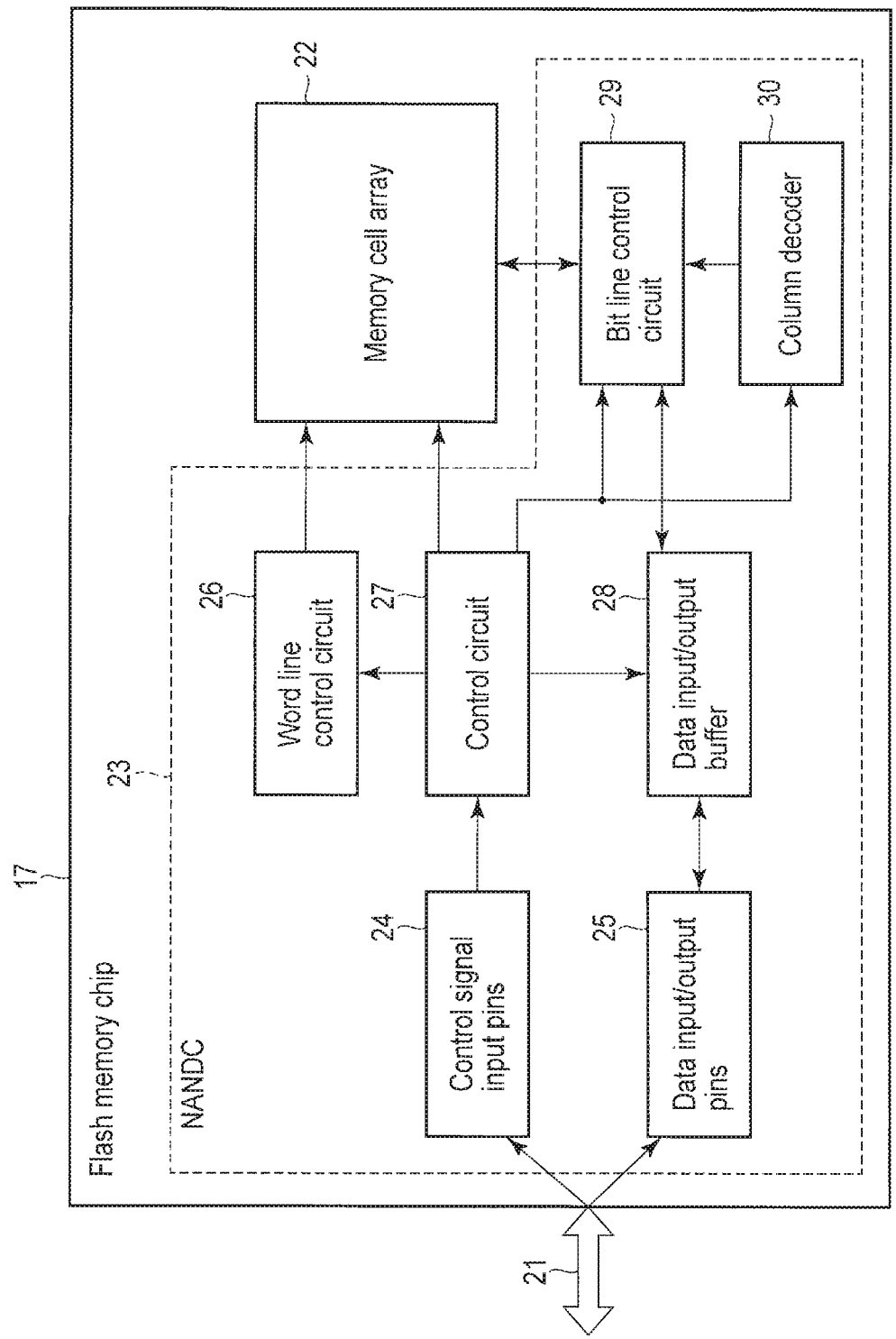
FIG. 5 is a block diagram of a flash memory chip in the storage device.

FIG. 5 is a block diagram of the flash memory chip 17 according to the first embodiment. The flash memory chip 17 includes a memory cell array 22 and a NAND controller (NANDC) 23.

The NANDC 23 is a controller controlling access to the memory cell array 22. The NANDC 23 includes control signal input pins 24, data input/output pins 25, a word line control circuit 26, a control circuit 27, a data input/output buffer 28, a bit line control circuit 29, and a column decoder 30.

The control circuit 27 is connected to the control signal input pins 24, the word line control circuit 26, the data input/output buffer 28, the bit line control circuit 29, and the column decoder 30, and controls these circuit components of the NANDC 23.

The memory cell array 22 includes a plurality of memory cells arranged in a matrix configuration, each of which stores data, as described below in detail.

Also, the memory cell array 22 is connected to the word line control circuit 26, the control circuit 27, and the bit line control circuit 29. Further, the control signal input pins 24 and the data input/output pins 25 are connected to the controller 14 of the storage device 2, through the flash memory interface 21.

When data are read from the flash memory chip 17, data in the memory cell array 22 are output to the bit line control circuit 29 and then temporarily stored in the data input/output buffer 28. Then, the read data are transferred to the controller 14 of the storage device 2 from the data input/output pins 25 through the flash memory interface 21. When data are written to the flash memory chip 17, data to be written (write data) are input to the data input/output buffer 28 through the data input/output pins 25. Then, the write data are transferred to the column decoder 30 through the control circuit 27, and input to the bit line control circuit 29 by the column decoder 30. The write data are written to memory cells of the memory cell array 22 according to a timing controlled by the word line control circuit 26 and the bit line control circuit 29.

When first control signals are input to the flash memory chip 17 from the controller 14 of the storage device 2 through the flash memory interface 21, the first control signals are input through the control signal input pins 24 into the control circuit 27. Then, the control circuit 27 generates second control signals, according to the first control signals from the controller 14, and controls voltages for controlling the memory cell array 22, the bit line control circuit 29, the column decoder 30, the data input/output buffer 28, and the word line control circuit 26. Here, a circuit section that includes the circuits other than the memory cell array 22 in the flash memory chip 17 is referred to as the NANDC 23.

Figure 6:
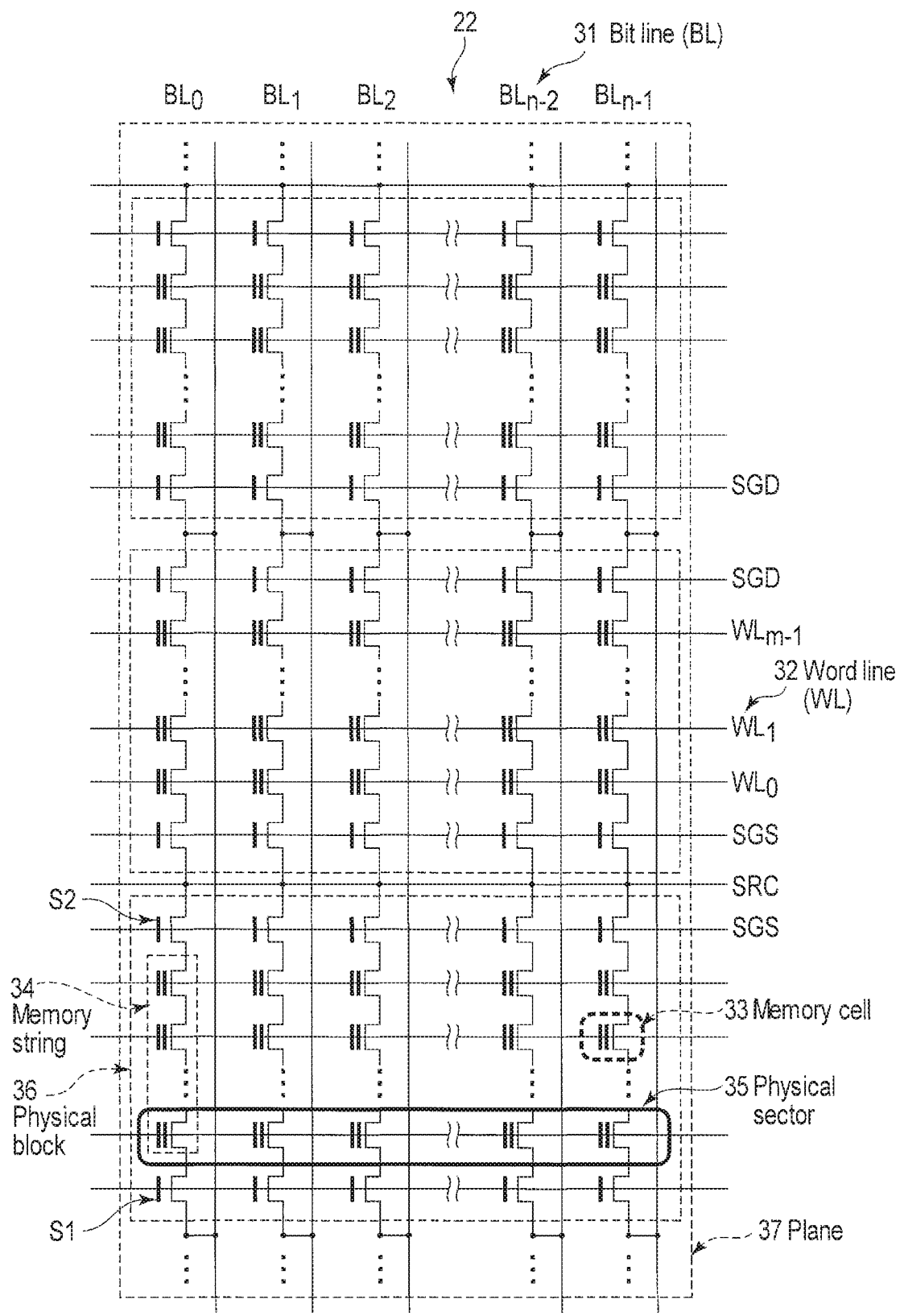
FIG. 6 illustrates a detailed circuit structure of a memory cell array in the flash memory chip.

FIG. 6 illustrates a detailed circuit structure of the memory cell array 22 according to the first embodiment. The memory cell array 22 includes one or more planes 37. Each plane 37 includes a plurality of physical blocks 36, and each physical block 36 includes a plurality of memory strings (MSs) 34. Further, each of the MSs 34 includes a plurality of memory cells 33.

The memory cell array 22 further includes a plurality of bit lines 31, a plurality of word lines 32, and a common source line. The memory cells 33, which are electrically data-rewritable, are arranged in a matrix configuration at intersections of bit lines 31 and the word lines 32. The bit line control circuit 29 is connected to the bit lines 31 and the word line control circuit 26 is connected to the word lines 32, so as to control data writing and reading with respect to the memory cells 33. That is, the bit line control circuit 29 reads data stored in the memory cells 33 via the bit lines 31 and applies a write control voltage to the memory cells 33 via the bit lines 31 and writes data in the memory cells 33 selected by the word line 32.

In each MS 34, the memory cells 33 are connected in series, and selection gates S1 and S2 are connected to both ends of the MS 34. The selection gate S1 is connected to the bit line 31 and the selection gate S2 is connected to a source line SRC. Control gates of the memory cells 33 arranged in the same row are connected in common to one of the word lines 32 WL0 to WLm-1. First selection gates S1 are connected in common to a select line SGD, and second selection gates S2 are connected in common to a select line SGS.

A plurality of memory cells 33 connected to one word line 32 configures one physical sector 35. Data are written and read for each physical sector 35. In the one physical sector 35, data equivalent to two physical pages (two pages) are stored when a two-bits-per-cell (four-level) write system (multi-level cell) is employed, and data equivalent to one physical page (one page) are stored when a one-bit-per-cell (two-level) write system (single-level cell) is employed. Further, when a three-bits-per-cell (eight-level) write system (triple-level cell) is employed, data equivalent to three physical pages (three pages) are stored in the one physical sector 35. Further, data are erased in a unit of the physical block 36.

During a write operation, a read operation, and a program verify operation, one word line WL is selected according to a physical address, such as a row address, received from the controller 14, and, as a result, one physical sector 35 is selected. Switching of a page in the selected physical sector 35 is performed according to a physical page address in the physical address. In the present embodiment, the flash memory 16 employs the two-bits-per-cell write method, and the controller 14 controls the physical sector 35, recognizing that two pages, i.e., an upper page and a lower page, are allocated to the physical sector 35, as physical pages. A physical address may include physical page addresses and physical block address. A physical page address is assigned to each of the physical pages, and a physical block address is assigned to each of the physical blocks 36.

The four-level NAND memory of two bits per cell is configured such that a threshold voltage in one memory cell could have four kinds of distributions.

Figure 7:
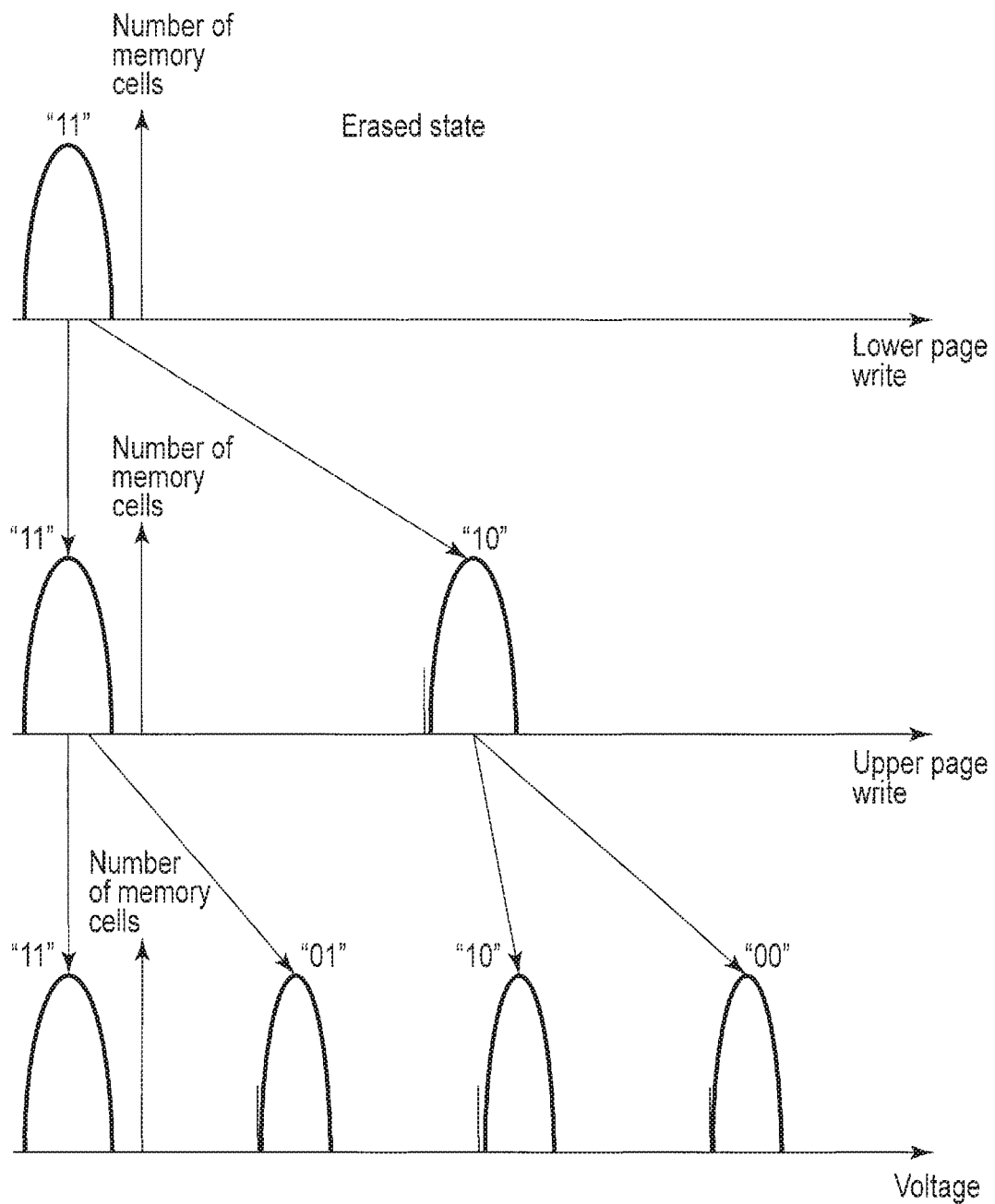
FIG. 7 illustrates a relation between two-bit four-level data stored in a memory cell of a four-level NAND cell type.

FIG. 7 illustrates a relation between two-bit four-level data (11, 01, 10, and 00) stored in a memory cell 33 of a four-level NAND cell type. Two-bit data of one memory cell 33 includes lower page data and upper page data. The lower page data and the upper page data are written to the memory cell 33 according to separate write operations, i.e., two write operations. Here, when data are represented as "XY," "X" represents the upper page data and "Y" represents the lower page data. An erased state is represented by "00".

Each of the memory cells 33 includes a memory cell transistor, for example, a metal oxide semiconductor field-effect transistor (MOSFET) having a stacked gate structure formed on a semiconductor substrate. The stacked gate structure includes a charge storage layer (floating gate electrode) formed on the semiconductor substrate via a gate insulating film and a control gate electrode formed on the floating gate electrode via an inter-gate insulating film. A threshold voltage of the memory cell transistor changes according to the number of electrons accumulated in the floating gate electrode. The memory cell transistor stores data according to difference in the threshold voltage.

In the present embodiment, each of the memory cells 33 employs a write system of a four-level store method for two bits per cell (MLC), using an upper page and a lower page. Alternatively, the memory cells 33 may employ a write system of a two-level store method of one bit per cell (SLC), using a single page, an eight-level store method for three bits per cell (TLC), using an upper page, a middle page, and a lower page, or a multi-level store method for four bits per cell (quad-level cell) or more, or mixture of them. The memory cell transistor is not limited to the structure including the floating gate electrode and may be a structure such as a metal-oxide-nitride-oxide-silicon (MONOS) type that can adjust a threshold voltage by trapping electrons on a nitride interface functioning as a charge storage layer. Similarly, the memory cell transistor of the MONOS type can be configured to store data of one bit or can be configured to store data of a multiple bits. The memory cell transistor can be, as a non-volatile storage medium, a semiconductor storage medium in which memory cells are three-dimensionally arranged.

Figure 8:
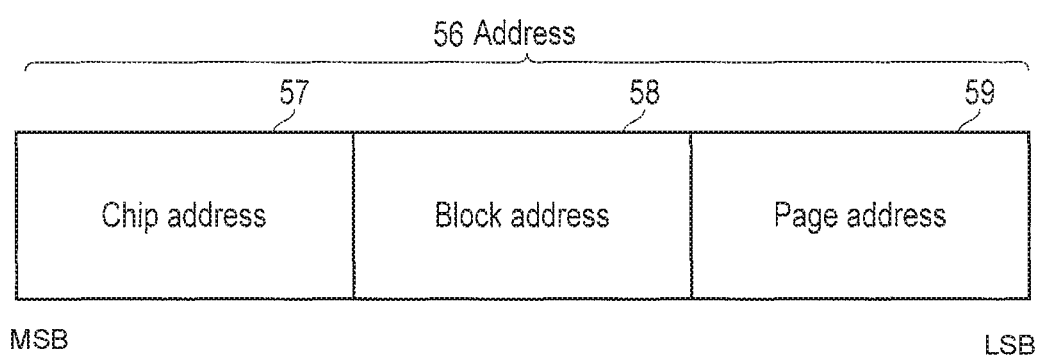
FIG. 8 illustrates a first example of an address configuration of the first embodiment.

FIG. 8 illustrates a first example of an address configuration as a physical address in the first embodiment. An address 56 includes a chip address 57, a block address 58, and a page address 59. In FIG. 8, the chip address 57 is positioned on the side of the most significant bit (MSB) and the page address 59 is positioned on the side of the least significant bit (LSB). However, positions of the chip address 57, the block address 58, and the page address 59 may be freely changed.

Figure 9:
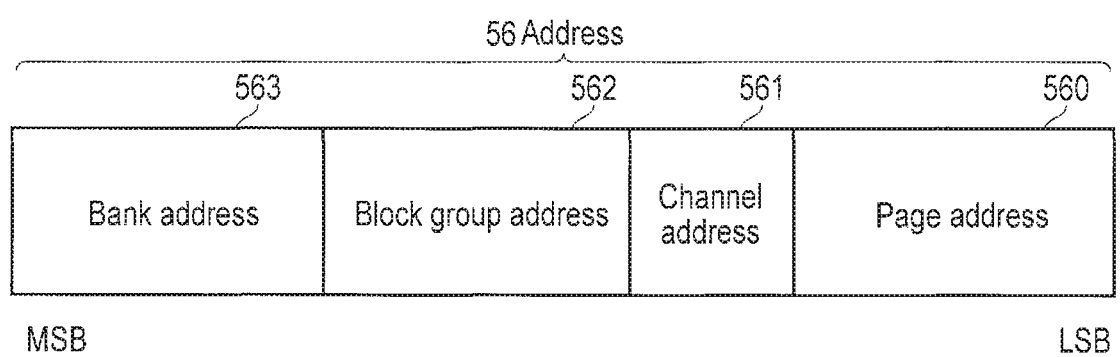
FIG. 9 illustrates a second example of an address configuration of the first embodiment.

FIG. 9 illustrates a second example of the configuration of the address 56 in the first embodiment.

The address 56 includes a bank address 563, a block group address 562, a channel address 561, and a page address 560. The bank address 563 corresponds to the chip address 57 in FIG. 8. The block group address 562 corresponds to the block address 58 in FIG. 8. The channel address 561 and the page address 560 correspond to the page address 59 in FIG. 8.

Figure 10A:
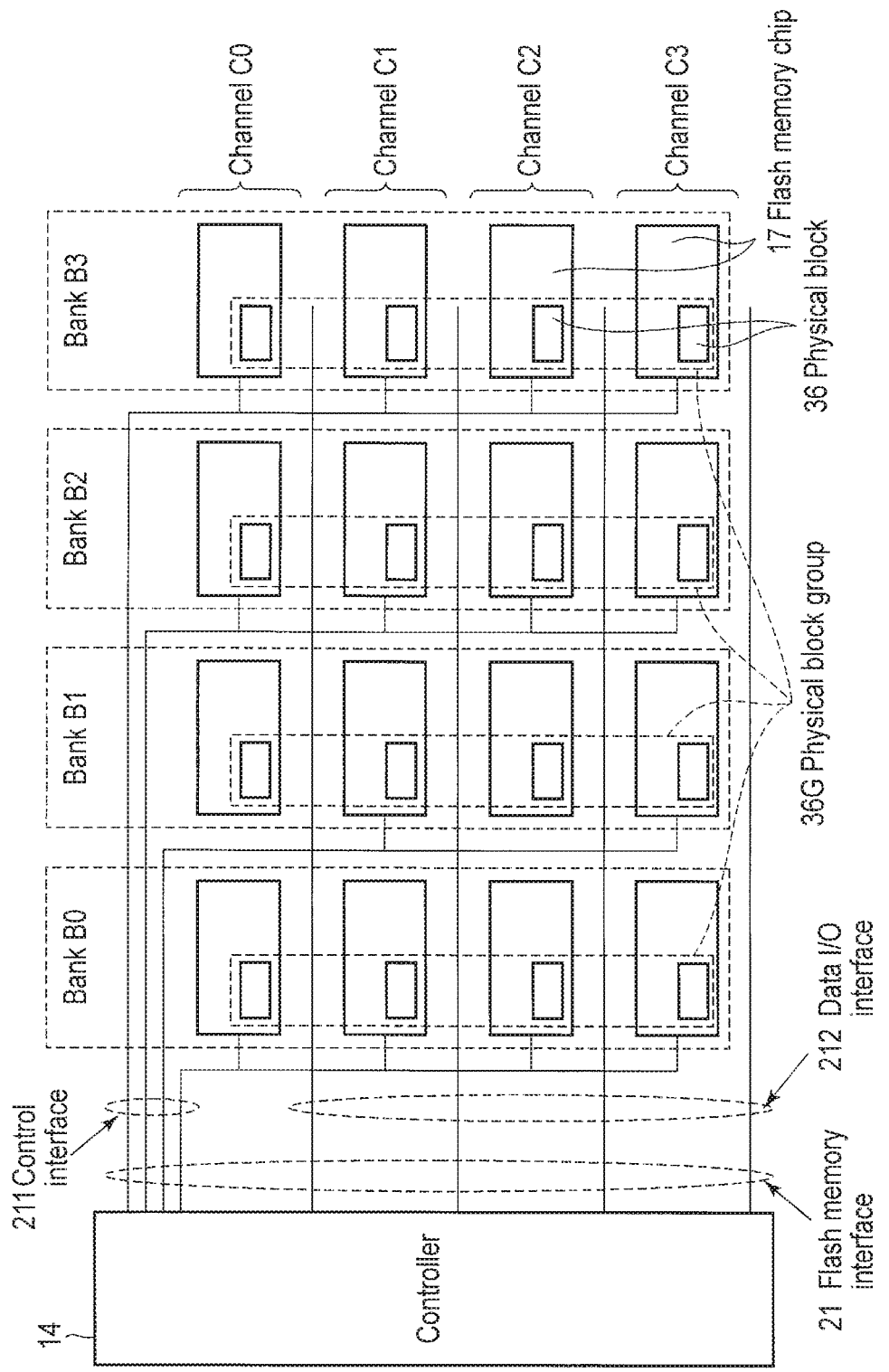
FIG. 10A is a block diagram of the storage device showing connection between a controller and a plurality of flash memory chips.

FIG. 10A is a block diagram of the flash memory chips 17 according to the first embodiment. FIG. 10A shows elements correspond to the addresses shown in FIG. 9. In FIG. 10A, the flash memory chips 17 are classified by channel groups C0 to C3 and bank groups B0 to B3 which are orthogonal to each other. The flash memory interface 21 between the controller 14 and the flash memory chips 17 includes a plurality of data I/O interfaces 212, which is connected to the data input/output pins 25 (See FIG. 5), and a plurality of control interfaces 211, which is connected to the control signal input pins 24 (See FIG. 5). Flash memory chips 17 that share a bus of the same data I/O interface 212 belong to the same channel group. Flash memory chips 17 that share a bus of the same control interface 211 belong to the same bank group. Flash memory chips 17 that belong to the same bank group can thereby be accessed in parallel by simultaneously driving channels. Differing banks can operate in parallel by interleaving access (pipeline access). The controller 14 performs parallel operation more efficiently by fetching a command to access a bank in an idle state from the submission queue 50 in prior to a command to access a bank in a busy state. For example, the controller 14 fetches a command from the submission queue 50 in an interleaved manner, and if the command is for an access to a bank in a busy state, fetching of the command is postponed until the state of the bank changes to an idle state. Physical blocks 36 that belong to the same bank and have the same physical block address belong to the same physical block group 36G and are assigned with a physical block group address corresponding to the physical block address. As described above, by using a physical block group 36G of physical blocks 36 as a unit of block erasing and using a physical block group address as a unit of management of the BMT 46, a size of the BMT 46 and a memory size of the RAM 15 can be reduced. In addition, a size of the BMT 46 to be loaded upon start-up of the storage device 2 can be reduced and a start-up time of the storage device 2 can be further shortened.

In the present embodiment, the number of blocks of the physical block group can be determined by the host 3 for each stream. When the host 3 opens a stream, the host 3 specifies the following parameters in an open stream command:

Number of channels to be attached to the stream (NCAS).
Number of banks to be attached to the stream (NBAS).

As NCAS and NBAS in a stream increase, the performance to access the stream by the host 3 increases. On the other hand, a size of data erase unit increases as NCAS and NBAS increase.

Figure 10B:
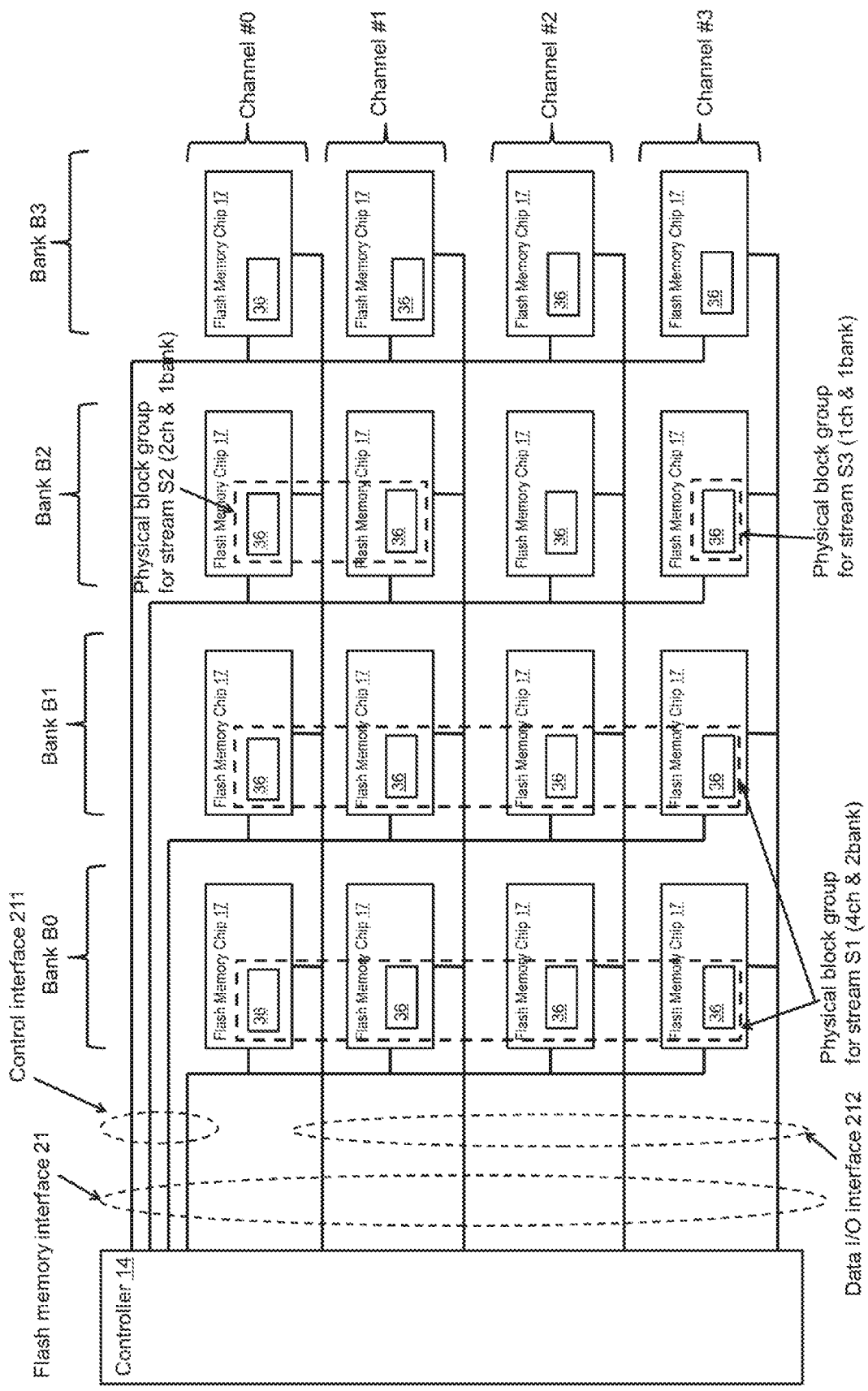
FIG. 10B is an example of streams established in the storage device.

FIG. 10B illustrates an example of streams established in the storage device 2. In FIG. 10B, when the host 3 operates to open stream S1 by an open stream command with NCAS=4 and NBAS=2, 4 channels and 2 banks are attached to stream S1. When the host 3 operates to open stream S2 by an open stream command with NCAS=2 and NBAS=1, 2 channels and 1 bank are attached to stream S2. When the host 3 operates to open stream S3 by an open stream command with NCAS=1 and NBAS=1, 1 channel and 1 bank are attached to stream S3. In general, if high-speed performance is prioritized over resource utilization efficiency is lower priority, the host 3 operates to open a stream of large NCAS and NBAS (such as NCAS=4 and NBAS=4). If resource utilization efficiency is prioritized over high-speed performance, the host 3 operates to open a stream of small NCAS and NBAS (such as NCAS=1 and NBAS=1).

FIG. 11 illustrates an overview of the mapping of the physical blocks based on the block pools in the first embodiment. The block pools include a free block pool 440, an input block pool 420, an active block pool 430, and a bad block pool 450.

The free block pool 440 includes one or more free blocks 44. The free block 44 is a block that does not store valid data. That is, all data in the free block 44 are invalid.

The input block pool 420 includes one or more input blocks 42. The input block 42 is a block to which data is written. The input block 42 partly stores data, and thus has a writable unwritten page.

The input block 42 is selected from the free blocks 44 in the free block pool 440. For example, a free block 44 that has the least number of erases or an arbitrary one of the free blocks 44 that have a number of erases less than or equal to a predetermined value may be selected as the input block 42.

The active block pool 430 includes one or more active blocks 43. The active block 43 is a block that is determined to have no area to write new data because it has been fully written.

The bad block pool 450 may include one or more bad blocks 45. The bad block 45 is a block that cannot be used to store data due to, for example, defects.

The controller 14 maps each of the physical blocks 36 to any of the block pools, in the BMT 46.

FIG. 12 shows an example of the BMT 46 according to the first embodiment.

The BMT 46 includes a free block table 461, an active block table 462, a bad block table 463, and an input block table 464. The BMT 46 is used to manage a physical block address list of the free blocks 44, the input block 42, the active blocks 43, and the bad blocks 45, respectively. Other configurations of different types of block pools may be also included in the BMT 46.

The input block table 464 also includes a physical page address (PATBW), in which next data will be written, for each input block 42. When the controller 14 re-maps a block in the free block pool 440 as the input block 42 in the input block table 464, the controller 14 removes a block address of the block from the free block table 461, adds an entry including the block address and PATBW=0 to the input block table 464.

Because bad blocks 45 of the flash memory 16 are managed by the controller 14 using the bad block table 463 in the BMT 46 of the storage device 2 in the present embodiment, the CPU 4 of the host 3 does not have to manage the bad blocks 45 and does not have to monitor unreliable physical blocks and defects of the flash memory 16. If a physical block is determined as unreliable by the controller 14 of the storage device 2, writing to the physical block is prevented by the controller 14 by deleting an entry of the corresponding block address from one of the input block table 464, the active block table 462, and the free block table 461 that includes the entry, and by adding the entry to the bad block table 463. For example, when a program error, an erase error, or an uncorrectable ECC error happens during access to a physical block, the controller 14 determines to remap the physical block as a bad block 45. Because a physical address in which data are to be written is not allocated by the host 3, but is allocated by the controller 14 in the present embodiment, the host 3 does not need to perform such bad block management.

In addition, because an erase count of each physical block is managed by the controller 14 of the storage device 2 using the BMT 46, the controller 14 carries out dynamic wear leveling and the CPU 4 of the host 3 does not have to carry out dynamic wear leveling when writing data into the flash memory 16. For example, in the present embodiment, when the controller 14 allocates an input block 42 from the free block pool 440, the controller 14 selects a free block 44 that has the least erase count from the free block pool 440 as the input block 42. If the free block 44 is located in a channel and a bank that are in a busy state, the controller 14 select another free block 44 that has the second least erase count and is in an idle state from the free block pool 440. Thus, the host 3 does not need to perform such dynamic wear leveling.

When the controller 14 processes a write operation of data to the input block 42, the controller 14 identifies a PATBW by referring to the input block table 464, writes the data to the page address in the input block 42, and increments the PATBW in the input block table 464 (PATBW=PATBW+ written data size). When the PATBW exceeds maximum page address of the block, the controller 14 re-maps the block in the input block pool 420 as an active block 43 in the active block pool 430.

Figure 13A:
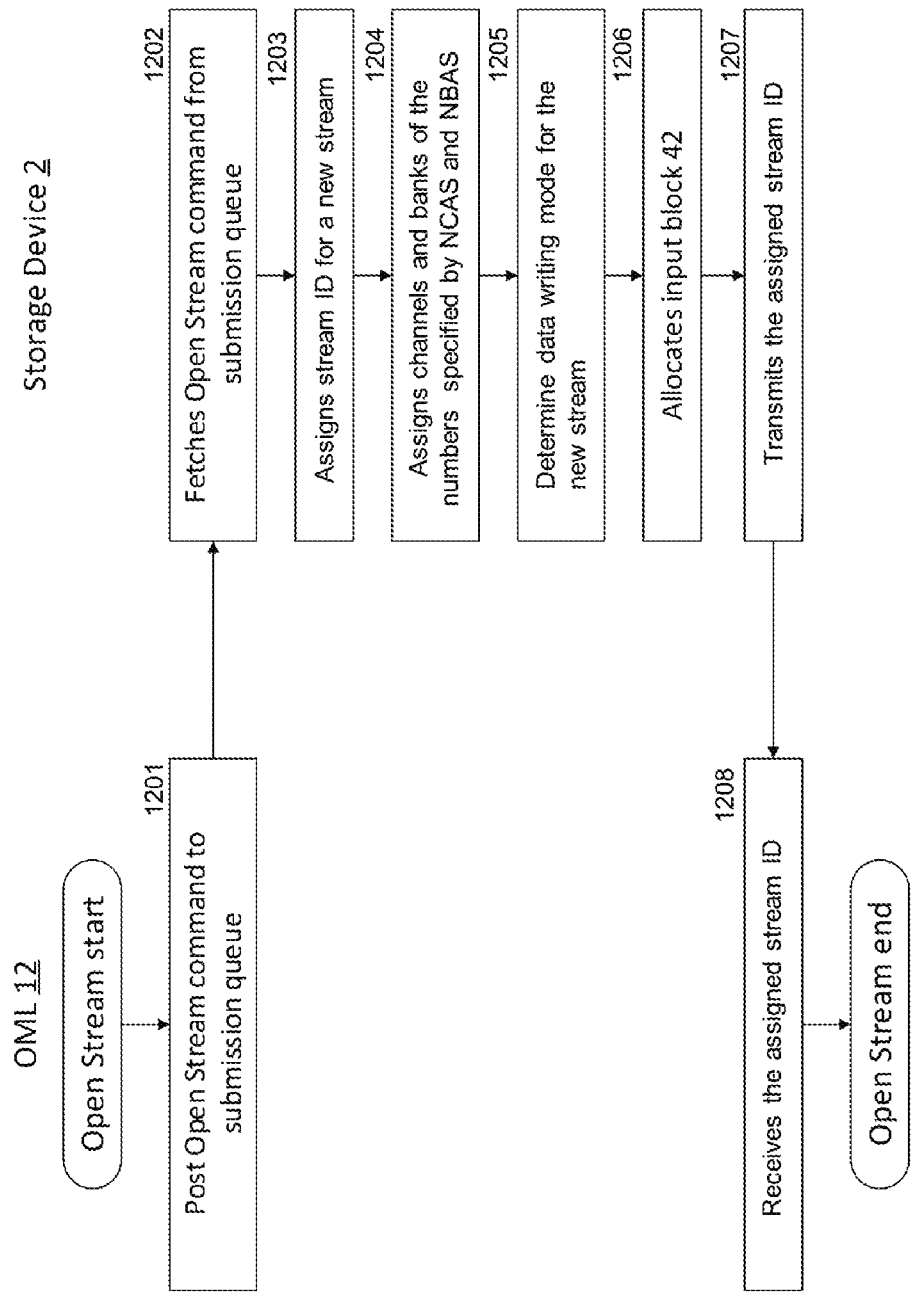
FIG. 13A is a flowchart of an open stream operation according to the first embodiment.

FIG. 13A is a flowchart which shows an example of an open stream operation performed by the OML 12 and the storage device 2 according to the first embodiment. The open stream command is used to open a new stream by the host 3.

In step 1201, the OML 12 posts an open stream command to the submission queue 50 in the host 3. The OML 12 includes NCAS, NBAS, and a bit to select if SLC write is chosen (BITXLC).

In step 1202, the controller 14 of the storage device 2 fetches the open stream command from the submission queue 50 via the interface 10.

In step 1203, the controller 14 assigns a stream ID to the new stream.

In step 1204, the controller 14 assigns channels and banks of the numbers specified by NCAS and NBAS, respectively, to the new stream.

In step 1205, the controller 14 determines a data writing mode according to which data are written to the input block 42 of the new stream based on BITXLC, where the data writing modes include MLC, TLC, QLC, and SLC modes.

In step 1206, the controller 14 allocates an input block 42 of the new stream from the free block pool 440.

In step 1207, the controller 14 transmits the assigned stream ID to the OML 12.

In step 1208, the OML 12 receives the assigned stream ID.

Figure 13B:
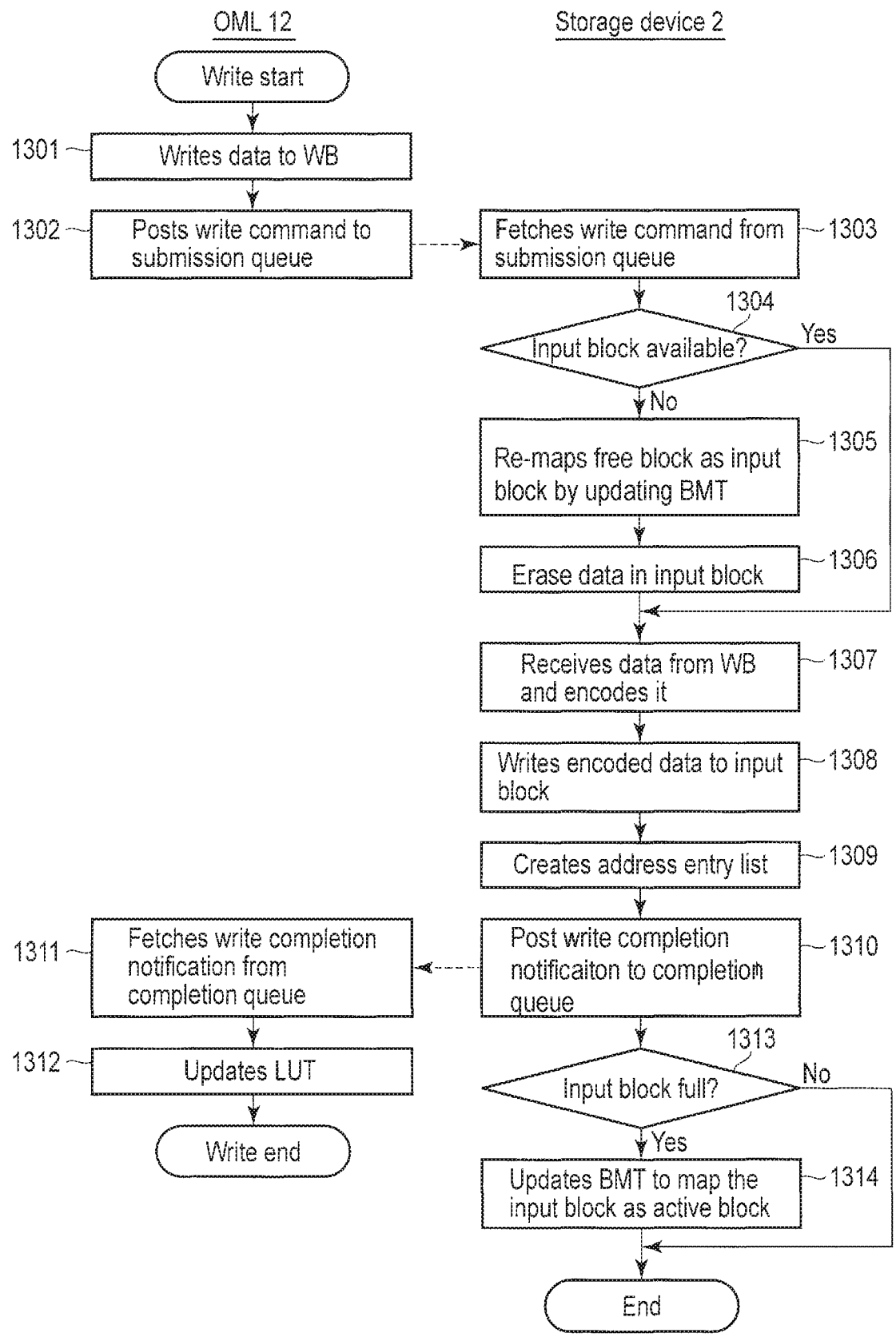
FIG. 13B is a flowchart of a write operation according to the first embodiment.

FIG. 13B is a flowchart which shows an example of a write operation performed by the OML 12 and the storage device 2 according to the first embodiment.

In step 1301, the OML 12 stores write data and also a unique command identifier (UCID) to the write buffer memory 20 in the host 3. Instead of storing data, a pointer indicating an area in the memory 5 in which the write data have been already stored may be stored in the write buffer memory 20. The UCID is a unique ID assigned to each operation initiated by the host 3. For example, the UCID is a 16-bit integer which is sequentially assigned by the OML 12. For example, when the write operation is for writing data of an object into the storage device 2, the OML 12 stores a mapping between an object ID of the object and the UCID in the buffer memory 20.

This UCID is use to distinguish an operation corresponding to a return notification from the controller 14 of the storage device 2 (See step 1301), when a plurality of commands is executed by the controller 14 in parallel. Without this UCID, the OML 12 may not know to which operation the returned notification corresponds. The mapping between the object ID and the UCID is maintained in the buffer memory 20 at least until the return notification is fetched (step 1311) and a mapping between the object ID and a physical address in which data are written is updated (step 1312).

In step 1302, the OML 12 posts a write command to the submission queue 50 in the host 3. The OML 12 includes a size of data to be written in the write command 40 but does not include an address in which data are to be written, in the write command. The OML 12 also includes the UCID in the write command 40.

In step 1303, the controller 14 fetches the write command from the submission queue 50 via the interface 10.

In step 1304, the controller 14 determines whether an input block 42 is available. If the input block 42 is not available, the process proceeds to step 1305. If input block 42 is available, the process proceeds to step 1307.

In step 1305, the controller 14 re-maps a free block 44 in the free block pool 440 as a (new) input block 42 by updating the BMT 46. If at least one of NCAS and NBAS included in the open stream command has been greater than 1 and the write operation is posted for the stream, the controller 14 remaps a free block 44 as a new input block 42 for each channel and for each bank assigned for the stream. For example, when the write operation is carried out with respect to stream S1 in FIG. 10B, the controller 14 assigns eight blocks (4 channels×2 banks) as new input blocks.

In step 1306, the controller 14 erases (old) data in the input block(s) 42.

In step 1307, the controller 14 receives data (write data) from the write buffer memory 20 via the interface 10 and encodes the data.

In step 1308, the controller 14 specifies a page address to be written by referring the BMT 46 and writes the encoded data to the specified page address of the input block 42. If NCAS in an open stream command has been greater than 1 and the write operation is posted for the stream, the controller 14 writes the encoded data to a plurality of channels (the number of NCAS) in parallel. If NCBS NCAS in an open stream command has been is greater than 1 and the write operation is posted for the stream, the controller 14 writes the encoded data to a plurality of banks (the number of NCBS) in parallel. If NCAS and NCBS in an open stream command have been both greater than 1 and the write operation is posted for the stream, the controller 14 writes the encoded data to a plurality of channels and banks (NCAS×NCBS number) in parallel.

In step 1309, the controller 14 creates an address entry list which includes physical address to which the data were written through this write operation.

In another embodiment, step 1308 may be performed after step 1310. In this case, in step 1309, the controller 14 generates an address entry list which includes a physical address to which the data are to be written through the subsequent step 1308.

In step 1310, the controller 14 posts a write completion notification including the address entry list to the completion queue 51 via the interface 10. In another embodiment, in step 1310, the controller 14 may post a write completion notification including a pointer which indicates an address of the memory 5 of the host 3 in which the address entry list is stored, after storing the address entry list in the memory 5. The controller 14 also includes, in the write completion notification, the UCID included in the write command.

In step 1311, the OML 12 fetches the write completion notification from the completion queue 51, and the OML 12 get the written physical address and the UCID. Even when order of processing of several write commands are re-ordered (in other words, even when the order of sending write commands are not the same as the order of receiving write command completion notifications), the OML 12 can identify each write command corresponding to each write completion notification based on the UCID included in the write completion notification.

In step 1312, the OML 12 updates the LUT 19 to map an object ID to the written physical address or addresses.

After step 1310, the controller 14 determines whether the input block 42 is filled in step 1313.

If the input block 42 is filled, the controller 14 updates the BMT 46 to re-map the input block 42 as the active block 43 in step 1314.

If the input block 42 is not filled, the process is finished.

FIG. 14 schematically illustrates a first example of an architecture overview of the write operation performed in the storage device 2 of the first embodiment. In the write operation, the controller 14 writes the write data from the write buffer memory 20 to the flash memory 16. Each of the input block pool 420, the active block pool 430, the free block pool 440, and the bad block pool 450 in FIG. 14 includes one or more physical blocks.

The controller 14 receives the write data from the write buffer memory 20 via the interface 10 and encodes the write data using an ECC encoder 48 in the controller 14.

The controller 14 decodes read data using an ECC decoder 49 in the controller 14.

When the controller 14 writes the write data from the write buffer memory 20 to the flash memory 16, the controller 14 looks up physical addresses of pages in the input block 42 of the input block pool 420 in which data are to be written by referring to the BMT 46. If there is no available input block 42 in the flash memory 16, the controller 14 allocates a new input block 42 by re-mapping a free block 44 in the free block pool 440. If no physical page in the input block 42 is available for data writing without erasing data therein, the controller 14 re-maps the block as an active block 43 in the active block pool 430. The controller 14 may further re-map (de-allocate) a block in the active block pool 430 as a free block 44 in to the free block pool 440.

FIG. 15 schematically illustrates a second example of the architecture overview of the write operation performed in the storage device 2. In this architecture, an input block 42 in an input block pool 420 are prepared for data writing with respect to each stream ID, and write data associated with a certain stream ID is stored in a physical block associated with the stream ID. The write command includes the stream ID as another parameter in this example. When the OML 12 posts the write command specifying a stream ID to the submission queue 50, the controller 14 writes the write data from the write buffer memory 20 to the input block 42 corresponding to the specified stream ID. If the OML 12 posts a write command which does not specify a stream ID to the submission queue 50, the controller 14 writes the write data from the write buffer memory 20 to the input block 42 corresponding to non-stream group. By storing the write data in accordance with the stream ID, the type of data (or lifetime of data) stored in the physical block 36 can be uniform, and as a result, it is possible to increase a probability that the data in the physical block can be deleted without having to transfer part of the data to another physical block 36 when the garbage collection operation is performed.

FIG. 16 schematically illustrates a third example of the architecture overview of the storage device 2 for the write operation. In this architecture, two or more input blocks 42 for writing data are prepared with respect to n bits per cell write system, and the write data is stored in the physical block 36 in one of SLC, MLC, and TLC manner. The write command includes a bit density (BD) as another parameter in this example. If the OML 12 posts the write command specifying BD=1 to the submission queue 50, the controller 14 writes the write data from the write buffer memory 20 to the input block 42 in one-bit-per-cell manner (SLC). If the OML 12 posts the write command specifying BD=2 to the submission queue 50, the controller 14 writes the write data from the write buffer memory 20 to the input block 42 in two-bits-per-cell manner (MLC). If the OML 12 posts the write command specifying BD=3 to the submission queue 50, the controller 14 writes the write data from the write buffer memory 20 to the input block 42 in three-bits-per-cell manner (TLC). If the OML 12 posts the write command specifying BD=0 to the submission queue 50, the controller 14 writes the write data from the write buffer memory 20 to the input block 42 in default manner which is one of SLC, MLC, and TLC. Writing data by SLC manner has highest write performance and highest reliability, but has lowest data density. Writing data by MLC manner has highest data density, but has lowest write performance and lowest reliability. According to the present embodiment, the OML 12 can manage and control a write speed, density, and reliability of the input block 420 by controlling BD.

Figure 13C:
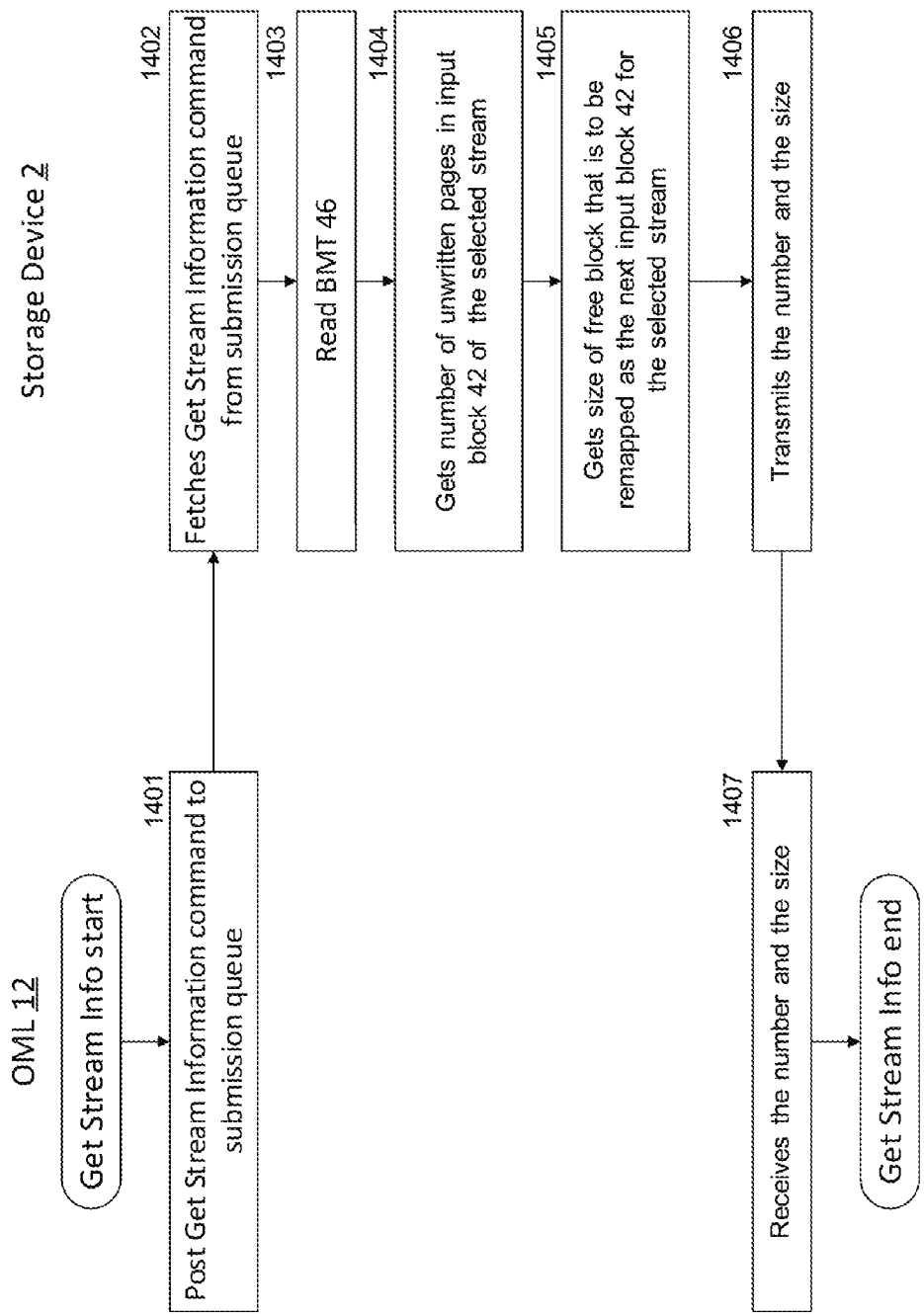
FIG. 13C is a flowchart of a get stream information operation according to the first embodiment.

FIG. 13C is a flowchart of a get stream information operation performed by the OML 12 and the storage device 2 of the first embodiment. Through the get stream information operation, the host 3 can know remaining capacity of each input block 42 associated with a stream ID.

In step 1401, the OML 12 posts a get stream information command to the submission queue 50 in the host 3. The OML 12 includes, in the get stream information command, a stream ID of a target stream for which the OML 12 is going to obtain information.

In step 1402, the controller 14 fetches the get stream information command from the submission queue 50 via the interface 10.

In step 1403, the controller 14 reads the BMT 46. In step 1404, the controller 14 determines the number of unwritten pages (size of unwritten space) in each input block 42 associated with the stream ID.

In step 1405, the controller 14 determines a size (number of pages) of a free block 44 that is to be remapped as the next input block 42 for the stream.

In step 1406, the controller 14 transmits the number of unwritten pages and the size of the free block to the OML 12.

In step 1407, the OML 12 receives the number of unwritten pages and the size of the free block.

According to the get stream information operation, the OML 12 can know free space in each input block associated with a stream ID. In other words, the OML 12 can determine an optimal size of input block in which write data are to be written, such that the write data fit in the input block. If the data size of the write data is equal to the size of an input block associated with the stream, the write data are less likely to be dividedly written into a plurality of blocks. As a result, a write amplification factor (WAF) of the storage system 1 can be improved.

Figure 17:
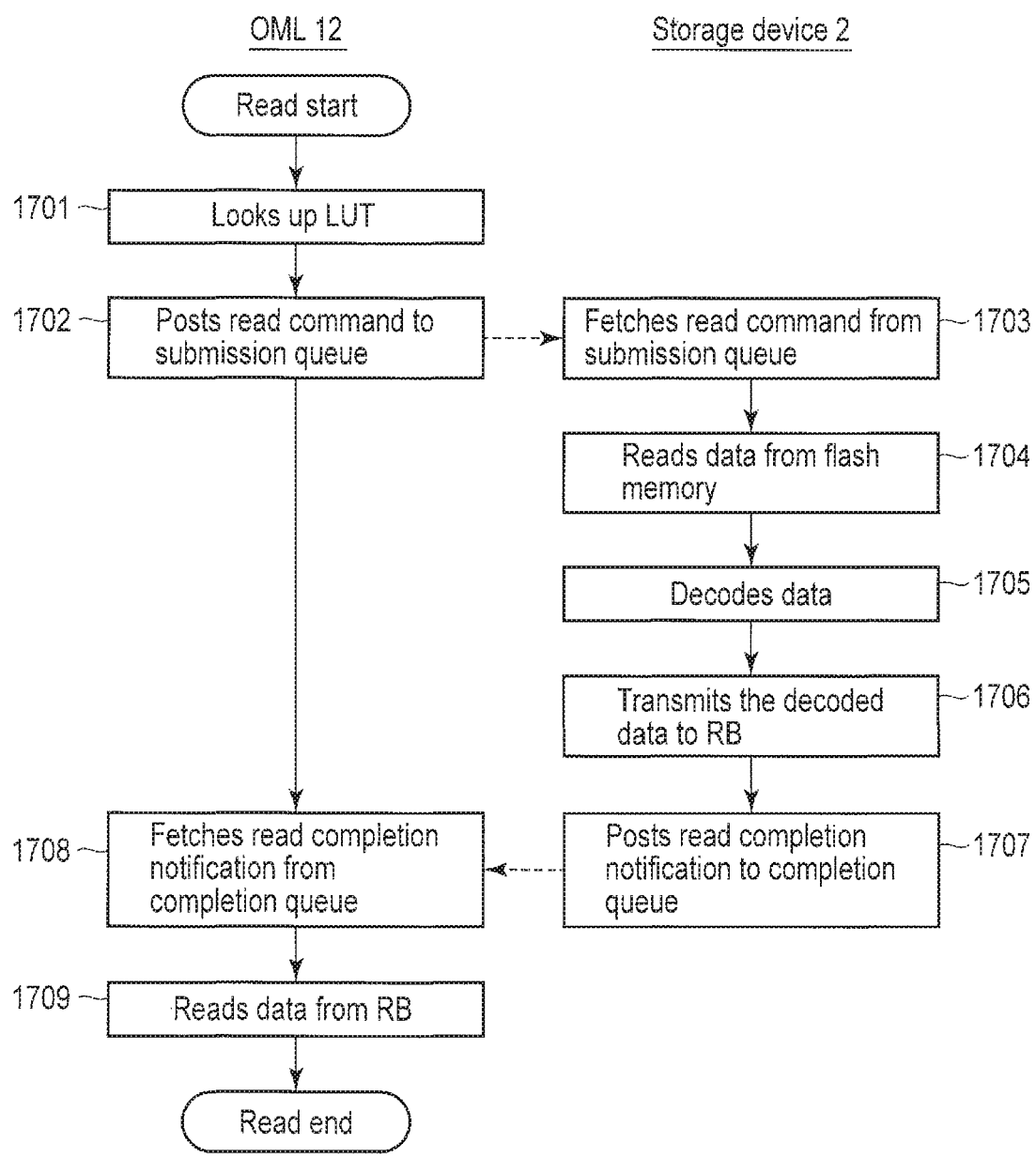
FIG. 17 is a flowchart of a read operation according to the first embodiment.

FIG. 17 is a flowchart of a read operation performed by the OML 12 and the storage device 2 of the first embodiment.

In step 1701, the OML 12 looks up the LUT 19 to convert an object ID to one or more physical addresses 56 to be read.

In step 1702, the OML 12 posts a read command to the submission queue 50 in the host 3. The OML 12 includes address entries which includes the physical addresses 56 to be read and a size of data to be read in the read command. The OML 12 may also include a parameter representing a maximum number of read retry operations (MNRRO) that the storage device 2 can perform with respect to the read command. The OML 12 may also include a parameter representing an ECC decoding level (ECCDL), which indicates the level (extent) the storage device 2 should perform ECC decoding.

In step 1703, the controller 14 fetches the read command from the submission queue 50 via the interface 10.

In step 1704, the controller 14 reads data from the physical addresses 56 of the flash memory 16 without obtaining the physical addresses 56 using the FTL.

In step 1705, the controller 14 decodes the read data using the ECC decoder 49 in the controller 14. The controller 14 selects an ECC decode algorithm from several options of different ECC decode capability based on the parameter of ECCDL, when the parameter is included in the read command. For example, if a light weight ECC decode is specified by ECCDL (e.g. ECCDL=1), the controller 14 selects hard decision decoding of low-density parity check code (LDPC) for the decoding in step 1705. If a heavy weight ECC decode is specified by ECCDL, the controller 14 selects soft decision decoding of LDPC for the decoding in step 1705. If the read data are uncorrectable through the decoding in step 1705, the controller 14 can repeat the read operation up to the number of times specified by MNRRO.

In step 1706, the controller 14 transmits the decoded data to the read buffer memory 55 via the interface 10.

In step 1707, the controller 14 posts a read completion notification to the completion queue 51 via the interface 10.

In step 1708, the OML 12 fetches the read completion notification from the completion queue 51.

In step 1709, the OML 12 reads the read data from the read buffer memory 55. The OML 12 may refer a pointer indicating the read data in the read buffer memory 55 without reading the data from the read buffer memory 55.

FIG. 18 is a flowchart of a delete operation performed by the OML 12 and the storage device 2 of the first embodiment.

In step 1801, the OML 12 updates the LUT 19 to invalidate mapping to a block to be deleted.

In step 1802, the OML 12 posts a delete command to the submission queue 50 in the host 3. The OML 12 includes address entries which includes a pair of the chip address (physical chip address) 57 and the block address (physical block address) 58 to be deleted in the delete command.

In step 1803, the controller 14 fetches the delete command from the submission queue 50 via the interface 10.

In step 1804, the controller 14 re-maps a block to be deleted as the free blocks 44 by updating the BMT 46, that is, invalidates data in the block.

In step 1805, the controller 14 posts a delete completion notification to the completion queue 51 via the interface 10.

In step 1806, the OML 12 fetches the delete completion notification from the completion queue 51.

Figure 19:
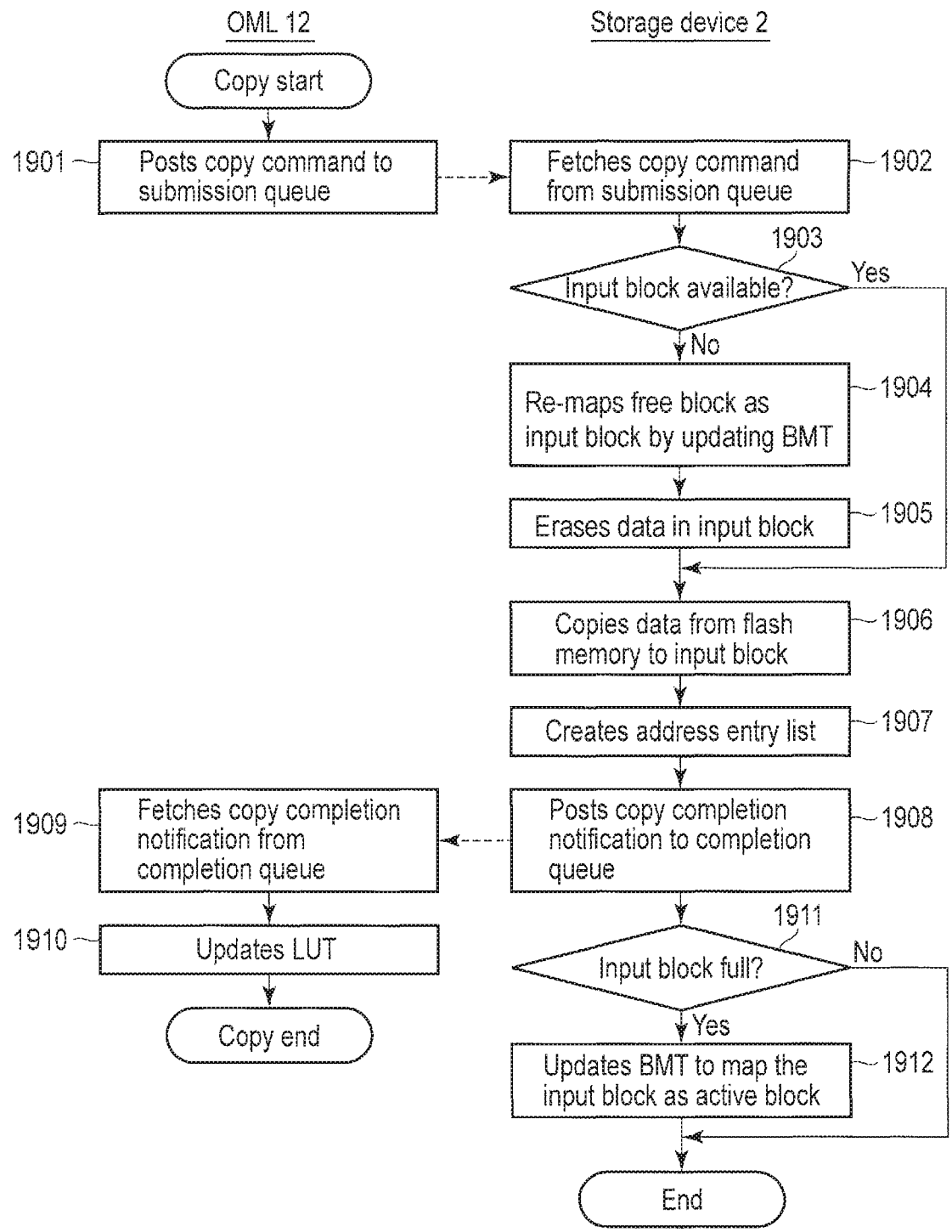
FIG. 19 is a flowchart of a copy operation according to the first embodiment.

FIG. 19 is a flowchart of a copy operation performed by the OML 12 and the storage device 2 of the first embodiment.

In step 1901, the OML 12 posts a copy command to the submission queue in the host 3. The OML 12 includes address entries which includes a pair of the address (physical address) 56 to be copied from and a size of data to be copied, in the copy command. The OML 12 also includes a stream ID and a UCID in the copy command. The UCID is a unique ID assigned to each command. For example, the UCID is a 16-bit integer which is sequentially assigned by the OML 12.

In step 1902, the controller 14 fetches the copy command from the submission queue 50 via the interface 10.

In step 1903, the controller 14 determines whether or not the input block 42 is available for the stream of the stream ID. If the input block 42 is not available, the process proceeds to step 1904. If the input block 42 is available, the process proceeds to step 1906.

In step 1904, the controller 14 re-maps a free block 44 in the free block pool 440 as an input block 42 for the stream by updating the BMT 46.

In step 1905, the controller 14 erases data in the input block 42.

In step 1906, the controller 14 copies data from physical addresses which are specified by the copy command to the input block 42 without transferring the data via interface 10. In this step, the controller 14 may decode the data by using the ECC decoder 49 in the controller 14 when the controller 14 reads the data, and the controller 14 may encodes the decoded data by using the ECC encoder 48 again.

In step 1907, the controller 14 creates an address entry list which includes physical addresses that were written in this copy operation.

In step 1908, the controller 14 posts a copy completion notification including the address entry list and the UCID to the completion queue 51 via the interface 10.

In another embodiment, in step 1908, the controller 14 may post a copy completion notification including a pointer which indicates an address of the memory 5 of the host 3 in which the address entry list is stored, after storing the address entry list in memory 5.

In step 1909, the OML 12 fetches the copy completion notification from the completion queue 51.

In step 1910, the OML 12 updates the LUT 19 to re-map an object ID to the written physical address.

After step 1910, the controller 14 determines whether or not the input block 42 is filled in step 1911.

If the input block 42 is filled, the controller 14 updates the BMT 46 to re-map the input block 42 as the active block 43 in step 1912.

If the input block 42 is not filled, the process is finished.

Figure 20:
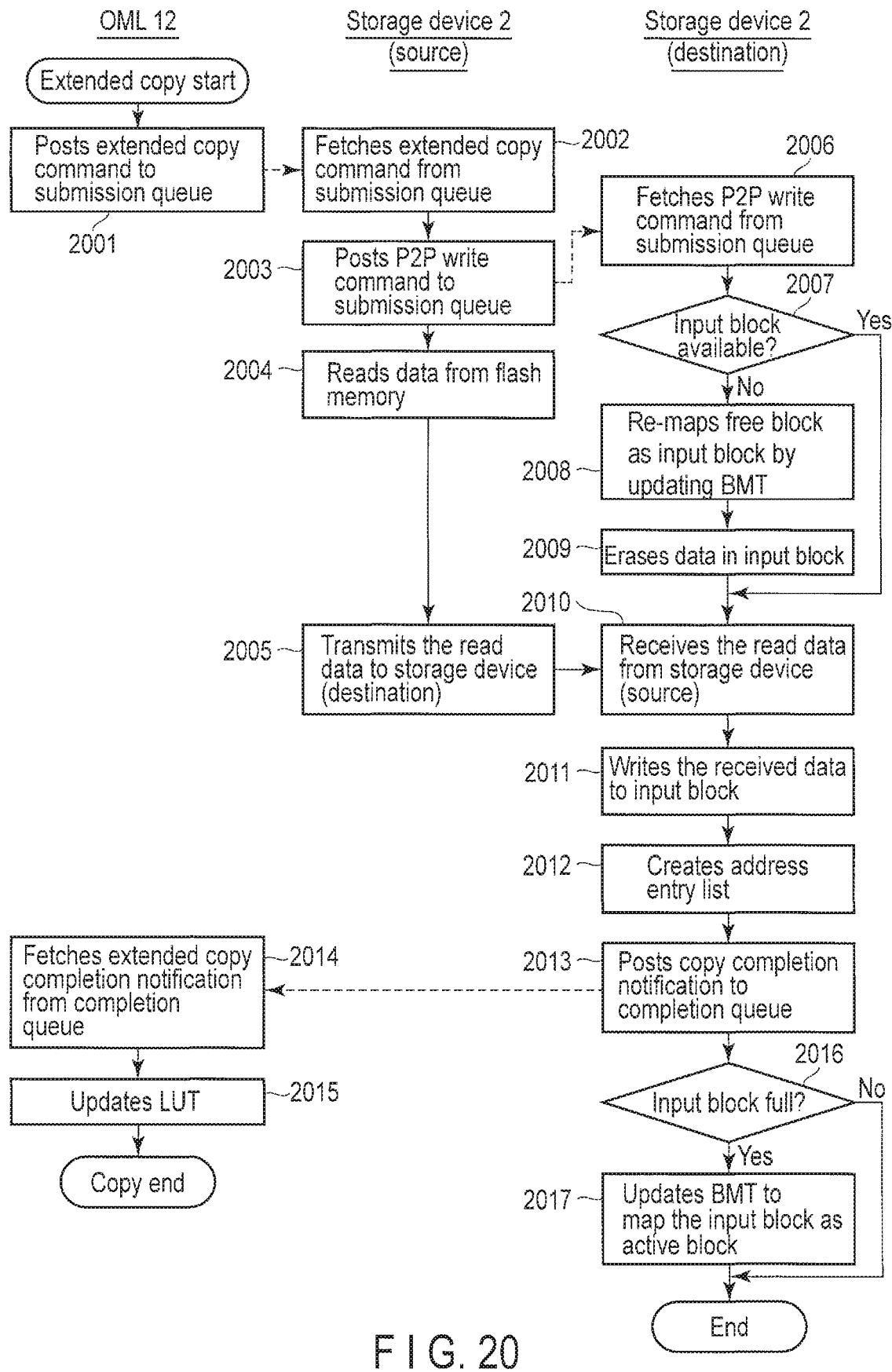
FIG. 20 is a flowchart of an extended copy operation according to the first embodiment.

FIG. 20 is a flowchart of an extended copy operation performed by the OML 12 and the storage device 2 of the first embodiment.

In step 2001, the OML 12 posts an extended copy command to the submission queue 50 in the host 3. The OML 12 includes a copy destination ID and address entries which includes a pair of the address 56 to be copied from and a size of data to be copied, in the extended copy command. The copy destination ID is a unique ID of a destination storage device 2 which data is copied to. In the present embodiment, world wide name (WWN) is used as the copy destination ID, but other unique ID such as a port number, a serial number (SN), IP address, or the like can be used.

In step 2002, the controller 14 of a source storage device 2 fetches the extended copy command from the submission queue 50 via the interface 10.

In step 2003, the controller 14 posts a peer-to-peer (P2P) write command to the submission queue 50. The P2P write command includes a size of data to be written.

In step 2004, the controller 14 of the source storage device 2 reads data from physical address which is specified by the extended copy command and decodes the read data.

In step 2005, the controller 14 of the source storage device 2 transmits the decoded data to the destination storage device 2 which is specified by the extended copy command. After that, the process proceeds to step 2010.

After step 2003, the controller 14 of the destination storage device 2 fetches the P2P write command from the submission queue 50 via the interface 10 and the controller 6 of the host 3 in step 2006.

In step 2007, the controller 14 of the destination storage device 2 refers the BMT 46, searches the input block 42 and determines whether the input block 42 is available. If the input block 42 is determined to be not available, the process proceeds to step 2010. If input block 42 is determined to be available, the process proceeds to step 2008.

In step 2008, the controller 14 of the destination storage device 2 re-maps a free block 44 in the free block pool 440 as an input block 42 by updating the BMT 46.

In step 2009, the controller 14 of destination storage device 2 erases data in the input block 42.

In step 2010, the controller 14 of the destination storage device 2 receives the data from the source storage device 2 and encodes the received data.

In step 2011, the controller 14 of the destination storage device 2 writes the encoded data to the input block 42.

In step 2012, the controller 14 of the destination storage device 2 creates an address entry list which includes physical addresses that were written in this extended copy operation.

In step 2013, the controller 14 of the destination storage device 2 posts an extended copy completion notification including the address entry list to the completion queue 51 via the interface 10.

In step 2014, the OML 12 fetches the extended copy completion notification from the completion queue 51.

In step 2015, the OML 12 updates the LUT 19 to re-map an object ID to the written physical address or addresses.

After step 2013, the controller 14 of the destination storage device 2 determines whether or not the input block 42 is filled in step 2016.

If the input block 42 is determined to be filled, the controller 14 of the destination storage device 2 updates the BMT 46 to re-map the input block 42 as the active block 43 in step 2017.

If the input block is determined to be not filled, the process is finished.

FIG. 21 is a flowchart of a garbage collection operation performed cooperatively by the OML 12 and the storage device 2 of the first embodiment.

In step 2101, the OML 12 determines the active block 43 to be subjected to garbage collection by referring to the LUT 19. In the LUT 19, a physical address mapped to an object ID corresponds to valid data. In the LUT 19, a physical address not mapped to an object ID is invalid data or in an unwritten state. The OML 12 estimates an amount of invalid data (=physical block size−amount of valid data) in each active block 43 by referring to the LUT 19. For example, the OML 12 preferentially determines an active block 43 that has the greatest amount of invalid data (or the highest ratio of invalid data) as a block to be subjected to the garbage collection.

In step 2102, the OML 12 and the controller 14 copy all data stored in the block to be subjected to the garbage collection through a copy operation, e.g., the copy operation shown in FIG. 19.

In step 2103, the OML 12 and the controller 14 delete the block from which the data is copied in step 2102 based on a delete operation, e.g., the delete operation shown in FIG. 18.

In step 2104, the OML 12 updates the LUT 19 to map an object ID to the written physical address.

Figure 22:
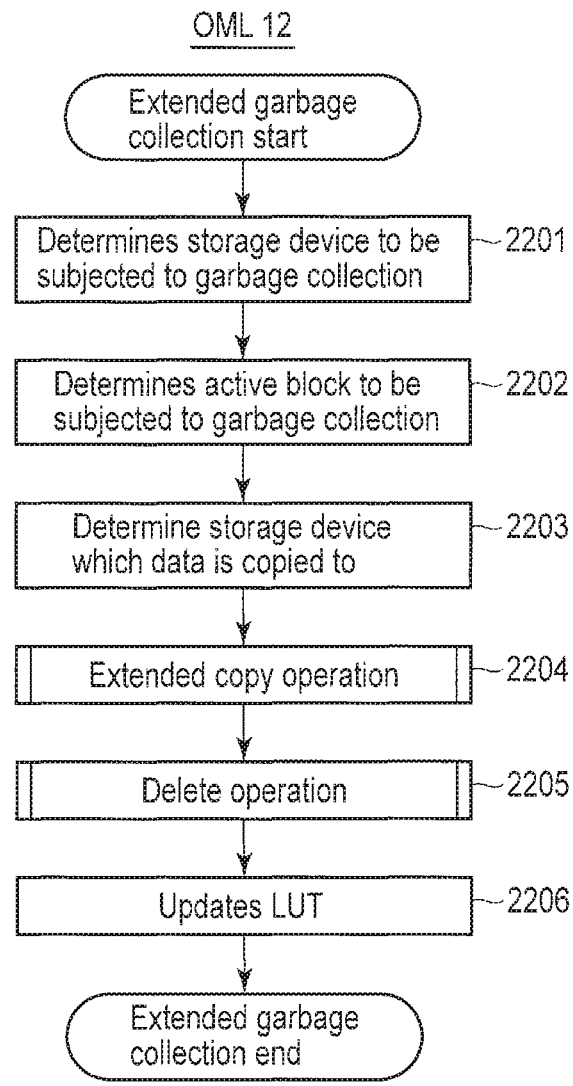
FIG. 22 is a flowchart of an extended garbage operation according to the first embodiment.

FIG. 22 is a flowchart which shows an example of an extended garbage collection operation performed cooperatively by the OML 12 and the storage device 2 of the first embodiment.

In step 2201, the OML 12 determines the storage device 2 to be subjected to garbage collection.

In step 2202, the OML 12 determines the active block 43 to be subjected to the garbage collection by referring to the LUT 19, similarly to step 2101.

In step 2203, the OML 12 determines the storage device 2 which data is copied to.

In step 2204, the OML 12 and the controller 14 perform extended copy of all data stored in the block to be subjected to the garbage collection based on an extended copy operation, e.g., the extended copy operation shown in FIG. 20.

In step 2205, the controller 14 re-re-map the block from which data is copied in step 2204 as a free block based on a delete operation, e.g., the delete operation shown in FIG. 18.

In step 2206, the OML 12 updates the LUT 19 to map an object ID to the written physical address.

As shown FIG. 22, the OML 12 can process the garbage collection by using the extended copy command without an increasing load to the CPU 4 in order to increase the number of free blocks in the storage device 2 if the number of free blocks is not enough.

Figure 23:
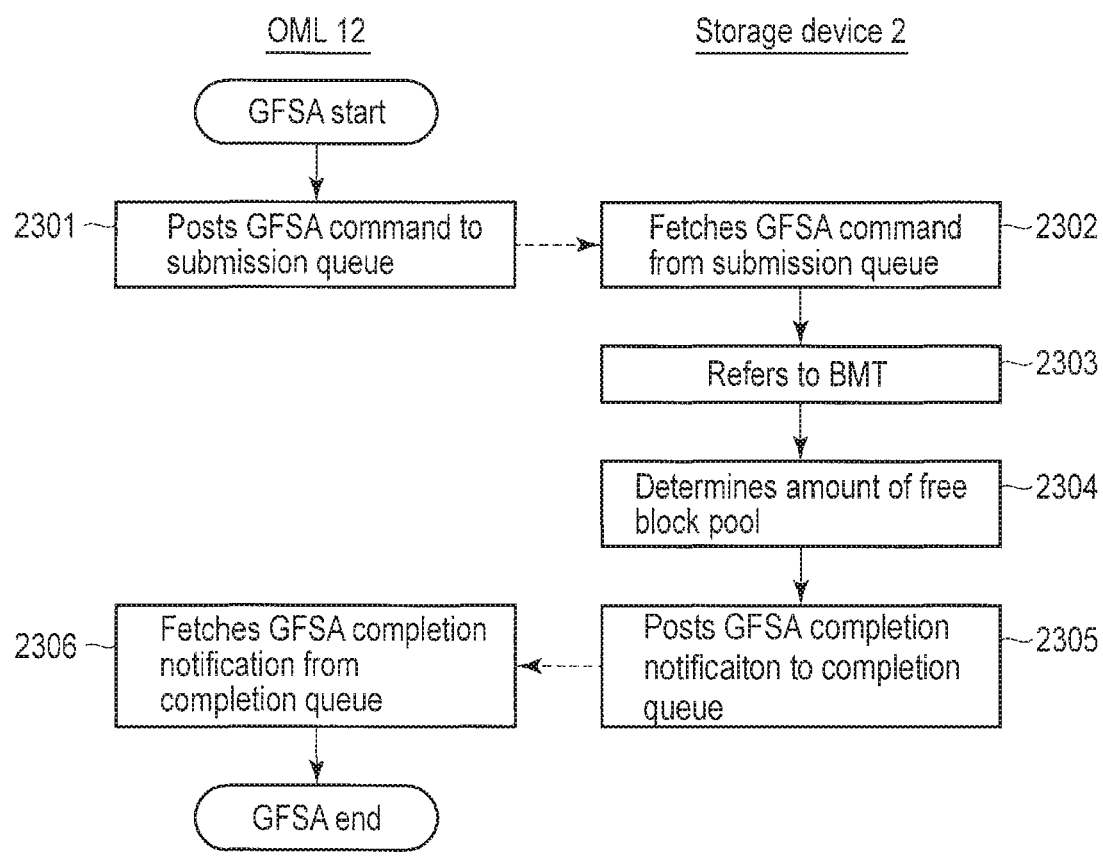
FIG. 23 is a flowchart of a Get Free Space Amount (GFSA) operation according to the first embodiment.

FIG. 23 is a flowchart which shows an example of a get free space amount (GFSA) operation performed by the OML 12 and the storage device 2 of the first embodiment.

In step 2301, the OML 12 posts a get free space amount (GFSA) command to the submission queue 50 in the host 3.

In step 2302, the controller 14 fetches the GFSA command from the submission queue 50 via the interface 10.

In step 2303, the controller 14 refers to the BMT 46.

In step 2304, the controller 14 determines amount of free block pool 440.

In step 2305, the controller 14 posts a GFSA completion notification including the determined amount of free block pool 440 to the completion queue 51 via the interface 10.

In step 2306, the OML 12 fetches the GFSA notification from the completion queue 51.

As shown FIG. 23, the OML 12 can monitor the amount of free blocks by using the GFSA command.

Figure 24:
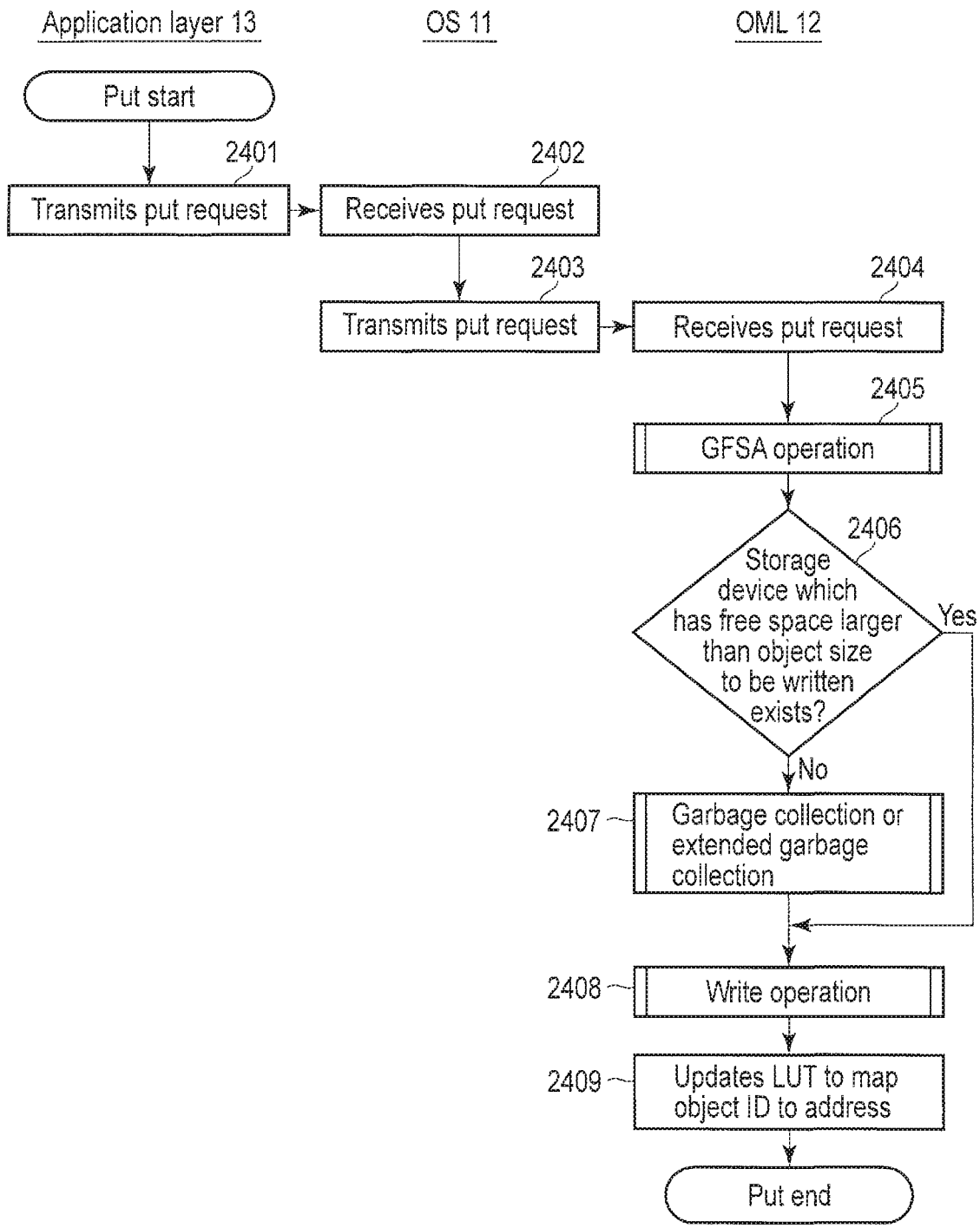
FIG. 24 is a flowchart of a put operation according to the first embodiment.

FIG. 24 is a flowchart of a put operation performed by the storage system 1 of the first embodiment.

In step 2401, the application software layer 13 transmits a put request to the OS 11.

In step 2402, the OS 11 receives the put request from the application software layer 13.

In step 2403, the OS 11 transmits the put request to the OML 12.

In step 2404, the OML 12 receives the put request from the OS 11.

In step 2405, the OML 12 performs a GFSA operation, e.g., the GFSA operation shown in FIG. 23.

In step 2406, the OML 12 determines whether a storage device 2 that has free space larger than an object size exists.

If it is determined that a storage device 2 that has free space larger than the object size does not exist, the OML 12 performs garbage collection or extended garbage collection in step 2407.

If it is determined that a storage device 2 that has free space larger than the object size exists, the OML 12 performs a write operation similar, e.g., the write operation shown in FIG. 13B.

In step 2409, the OML 12 updates the LUT 19 to map an object ID to the written physical address.

Figure 25:
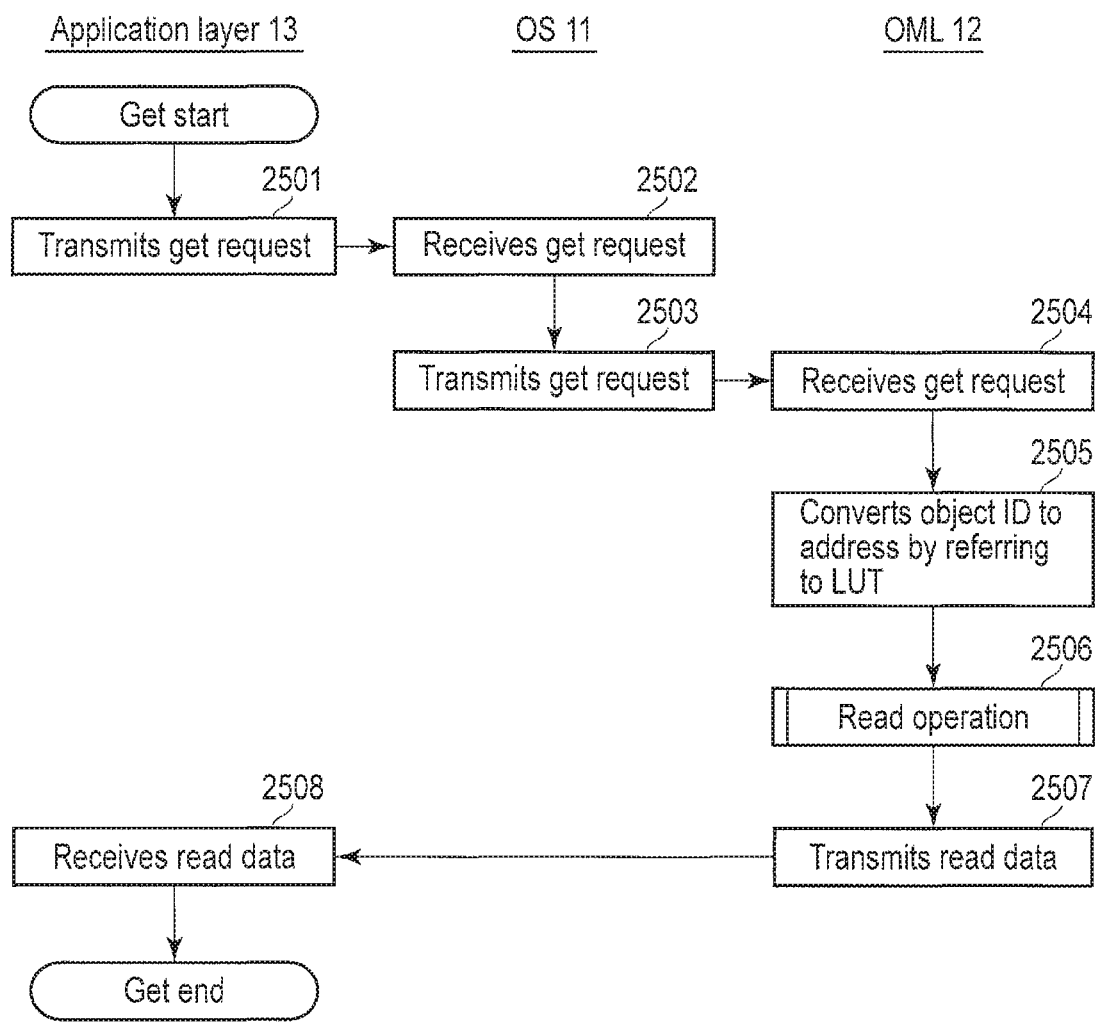
FIG. 25 is a flowchart of a get operation according to the first embodiment.

FIG. 25 is a flowchart of a get operation performed by the storage system 1 of the first embodiment.

In step 2501, the application software layer 13 transmits a get request to the OS 11.

In step 2502, the OS 11 receives the get request from the application software layer 13.

In step 2503, the OS 11 transmits the get request to the OML 12.

In step 2504, the OML 12 receives the get request from the OS 11.

In step 2505, the OML 12 converts an object ID to the physical address by referring to the LUT 19.

In step 2506, the OML 12 performs a read operation, e.g., the read operation shown in FIG. 17 for the converted physical address.

In step 2507, the OML 12 transmits read data to the application software layer 13.

In step 2508, the application software layer 13 receives the read data. In steps 2507 and 2508, the OLM 12 may transmit a pointer to the write buffer memory 20 to the application software layer 13 without transmitting the read data.

Figure 26:
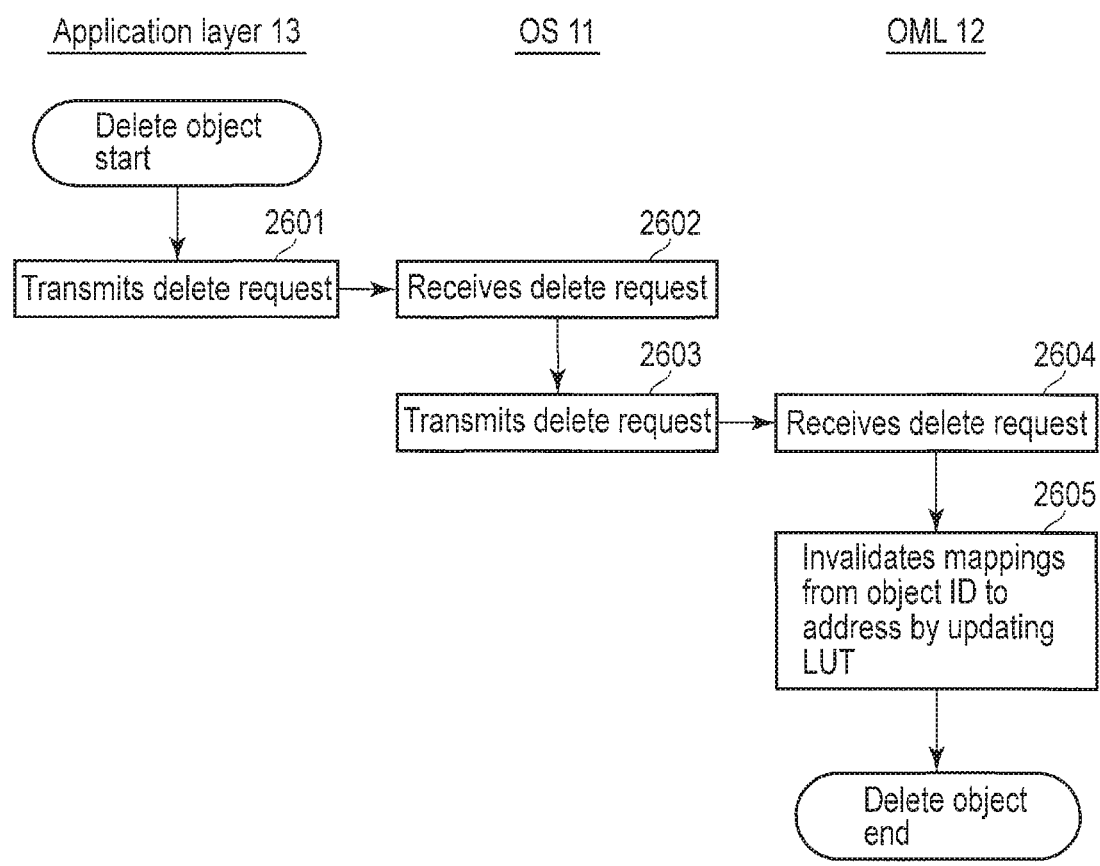
FIG. 26 is a flowchart of a delete object operation according to the first embodiment.

FIG. 26 is a flowchart of a delete object operation performed by the storage system 1 of the first embodiment.

In step 2601, the application software layer 13 transmits a delete object request to the OS 11.

In step 2602, the OS 11 receives the delete object request from the application software layer 13.

In step 2603, the OS 11 transmits the delete object request to the OML 12.

In step 2604, the OML 12 receives the delete object request from the OS 11.

In step 2605, the OML 12 invalidates mapping from an object ID to the written physical address 56 by updating the LUT 19.

FIG. 27 is a flowchart of a maintenance operation performed by the storage system 1 of the first embodiment through garbage collection. The OML 12 performs the maintenance operation on each storage device 2. Target of the maintenance operation is interleaved among all storage devices 2. The maintenance operation is not performed if the storage device 2 is busy.

In step 2701, the OML 12 performs a GFSA process. In step 2702, the OML 12 determines whether an amount of free space in the storage device 2 is less than a threshold.

If the amount of free space is less than the threshold, the OML 12 performs a garbage collection operation in step 2703.

If the amount of free space is greater than or equal to the threshold, the process is finished.

In the above-described present embodiment, the FTL is removed from the storage device 2 and the function of the controller 14 is reduced. Therefore, the area and size of circuit of the controller 14 can be reduced and power consumption and costs of development can also be reduced, for example, in comparison with a case where the FTL is not removed.

Furthermore, capacity density of the memory can be increased by reducing the area of circuit of the controller 14.

Moreover, since management information loaded by the controller 14 from the flash memory 16 on start-up of the storage device 2 is reduced to the BMT 46 at most, the start-up time of the storage device 2 can be shortened.

In the present embodiment, an object ID is converted to a physical address in the host 3. That is, one-step address translation is performed on the side of the host 3 in the present embodiment. In the present embodiment, therefore, latency of reading can be greatly reduced in comparison with a case of two-step address translation in which an object ID is converted to a logical block address and then the logical block address is converted to a physical address.

Second Embodiment

FIG. 28 is a block diagram of a storage system according to a second embodiment. In the second embodiment, the storage device 2 includes a non-volatile storage medium 16A, and the non-volatile storage medium 16A is, for example, a shingled magnetic recording hard disk including magnetic disks 71. Since the other configuration is the same as that of the first embodiment, the description is omitted.

Figure 29:
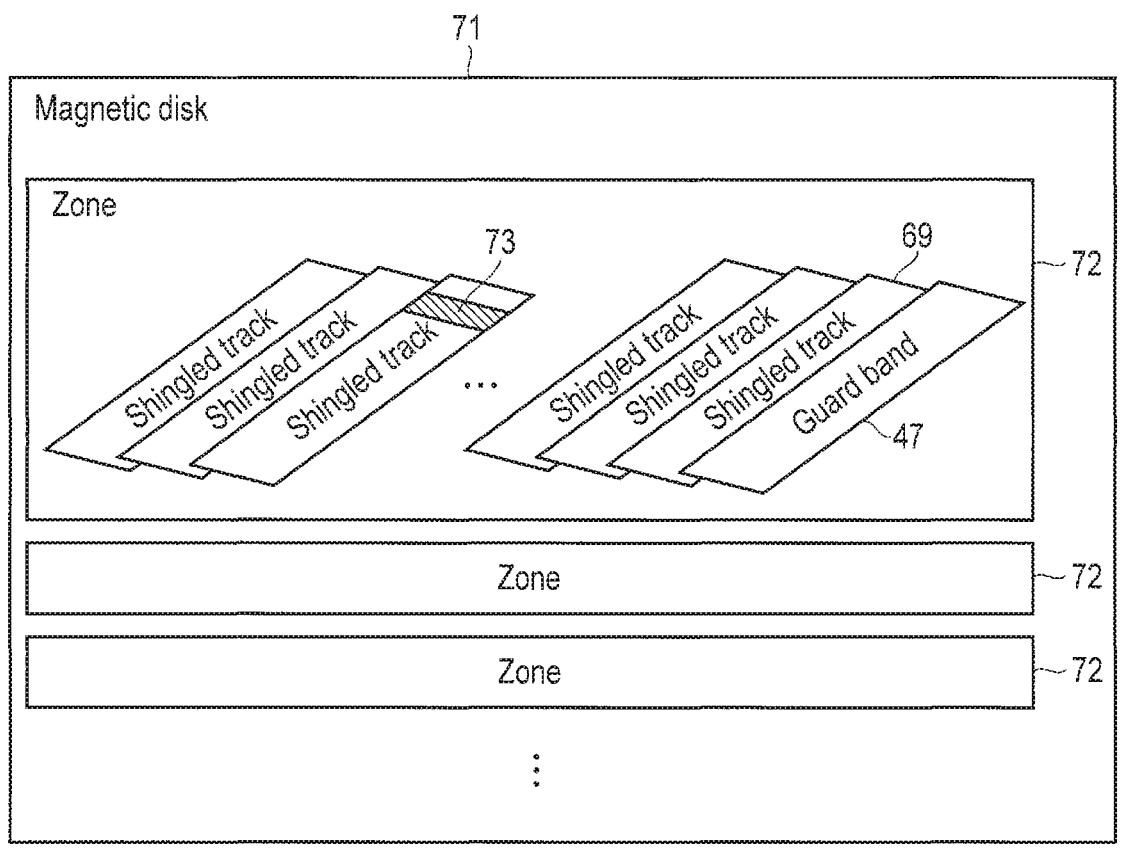
FIG. 29 schematically illustrates a configuration of a magnetic disk in the storage system according to the second embodiment.

FIG. 29 is a block diagram of one of the magnetic disks 71 according to the second embodiment. The magnetic disk 71 includes a plurality of zones 72. The zone 72 includes a plurality of shingled tracks 69 and a guard band 47. Each shingled track 69 includes a plurality of sectors 73. In the present embodiment, the zone 72 corresponds to the block 36 of the first embodiment. The sector 73 corresponds to the physical page of the first embodiment.

FIG. 30 illustrates an overview of mapping of zones based on zone pools of the second embodiment. The zone pools include a free zone pool 760, an input zone pool 740, an active zone pool 750, and a bad zone pool 770.

The free zone pool 760 includes one or more free zones 76.

The input zone pool 740 includes one or more input zones 74.

The active zone pool 750 includes one or more active zones 75.

The bad zone pool 770 may include one or more bad zones 77.

FIG. 31 schematically illustrates an architecture overview of a write operation performed in the storage device 2 of the second embodiment. In the write operation, the controller 14 writes data 41 from the write buffer 20 to the magnetic disk 71. The zone 72 belongs to any of the input zone pool 740, the active zone pool 750, the free zone pool 760, or the bad zone pool 770.

When the controller 14 writes data from the write buffer 20 to the magnetic disk 71, the controller 14 looks up a physical address of the shingled track 69 in the input zone 74 to be written by referring to the BMT 46. If there is no available input zone 74 in the magnetic disk 71, the controller 14 re-maps a free zone in the free zone pool 760 as a new input zone 74. If no shingled track 69 in the input zone 74 is available to be written without erasing data therein, the controller 14 re-maps the input zone 74 as an active zone 75 in the active zone pool 750. If there are not enough of zones in free zone pool 760, the controller 14 processes garbage collection (GC) to create the free zone 76 in the free zone pool 760 by re-mapping an active zone 75 in the active zone pool 750.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A storage system, comprising:
    a host including a processor and a memory including a submission queue; and
    a storage device including a controller and a non-volatile memory, wherein
    the processor is configured to carry out a host-managed garbage collection by determining a target physical location of the non-volatile memory to be subjected to the host-managed garbage collection, and then through a copy operation followed by a delete operation,
    during the copy operation in the host-managed garbage collection, the processor of the host posts a copy command including the target physical location and size information of data to be copied to the submission queue, and then the controller of the storage device fetches the copy command from the submission queue, determines a destination physical location of the non-volatile memory to which the data are to be copied based on the copy command and the size information, and copies the data stored in the target physical location to the destination physical location without transferring the data to the host, and during the delete operation in the host-managed garbage collection, the processor of the host posts a delete command including the target physical location to the submission queue, and then the controller of the storage device fetches the delete command from the submission queue, and specifies storage space at the target physical deletion location of the non-volatile memory as free.

2. The storage system according to claim 1, wherein
the memory of the host further includes a completion queue, and
during the copy operation in the host-managed garbage collection, the controller of the storage device cause a copy completion notification to be posted to the completion queue, and
the processor of the host posts the delete command to the submission queue after the copy completion notification is posted to the completion queue.

3. The storage system according to claim 2, wherein
the copy command includes an operation identifier of the copy operation, and
the processor of the host is further configured to generate mapping information between an identifier of the copied data associated with the operation identifier and the destination physical location upon the copy completion notification being posted to the completion queue.

4. The storage system according to claim 3, wherein during the delete operation in the host-managed garbage collection, the processor of the host invalidates mapping information between the identifier of the copied data and the target physical location, and then posts the delete command to the submission queue.

5. The storage system according to claim 2, wherein during the delete operation in the host-managed garbage collection, the controller of the storage device cause a delete completion notification to be posted to the completion queue.

6. The storage system according to claim 1, wherein
the controller of the storage device is further configured to manage a block mapping table that specifies an identifier of each of a plurality of memory blocks in the non-volatile memory in association with a current categorization of the memory block, and
the controller of the storage device determines, as the destination physical location, a physical location in a memory block that is currently categorized as an input block that accepts new data, based on the block mapping table.

7. The storage system according to claim 6, wherein the controller of the storage device is further configured to recategorize a free block that includes no valid data as the active block when no active block to store the data to be copied is mapped in the block mapping table.

8. The storage system according to claim 6, wherein the processor of the host determines, as the target physical location, a physical location in a memory block that is currently categorized as an active block that includes valid data and invalid data, based on the block mapping table and a ratio of an amount of the valid data with respect to an amount of the invalid data in the active block.

9. The storage system according to claim 8, wherein
the plurality of memory blocks in the non-volatile memory includes a first plurality of memory blocks associated with a first stream and a second plurality of memory blocks associated with a second stream, and
the input block and the active block are both associated with the first stream.

10. The storage system according to claim 1, wherein
the non-volatile memory includes a first memory chip and a second memory chip, and
the target physical location is a physical location in the first memory chip, and the destination physical location is a physical location in the second memory chip.

11. A method of carrying out a host-managed garbage collection in a storage system including a host having a write buffer and a submission queue, and a storage device having a non-volatile memory, comprising, during the host-managed garbage collection:
determining, by the host, a target physical location of the non-volatile memory to be subjected to the host-managed garbage collection;
after said determining, carrying out a copy operation including:
posting, in the host, a copy command including the target physical location and size information of data to be copied to the submission queue;
fetching, by the storage device, the copy command from the submission queue;
determining, by the storage device, a destination physical location of the non-volatile memory to which the data are to be copied based on the copy command and the size information; and
copying, by the storage device, the data stored in the target physical location to the destination physical location without transferring the data to the host; and
after the copy operation, carrying out a delete operation including:
posting, in the host, a delete command including the target physical location to the submission queue;
fetching, by the storage device, the delete command from the submission queue; and
specifying storage space at the target physical deletion location of the non-volatile memory as free.

12. The method according to claim 11, wherein
the host further includes a completion queue, and
the copy operation further includes posting, from the storage device, a copy completion notification to the completion queue, wherein the delete command is posted to the submission queue after the copy completion notification is posted to the completion queue.

13. The method according to claim 12, wherein
the copy command includes an operation identifier of the copy operation, and
the copy operation further includes generating, by the host, mapping information between an identifier of the copied data associated with the operation identifier and the destination physical location upon the copy completion notification being posted to the completion queue.

14. The method according to claim 13, wherein the delete operation further includes invalidating, by the host, mapping information between the identifier of the copied data and the target physical location, wherein the delete command is posted to the submission queue after said invalidating.

15. The method according to claim 12, wherein the delete operation further includes posting, from the storage device, a delete completion notification to the completion queue.

16. The method according to claim 11, further comprising:
managing a block mapping table that specifies an identifier of each of a plurality of memory blocks in the non-volatile memory in association with a current categorization of the memory block, wherein
a physical location in a memory block that is currently categorized as an input block that accepts new data is determined as the destination physical location, based on the block mapping table.

17. The method according to claim 16, wherein the copy operation further includes recategorizing, by the storage device, a free block that includes no valid data as the active block when no active block to store the data to be copied is mapped in the block mapping table.

18. The method according to claim 16, wherein a physical location in a memory block that is currently categorized as an active block that includes valid data and invalid data is determined as the target physical location, based on the block mapping table and a ratio of an amount of the valid data with respect to an amount of the invalid data in the active block.

19. The method according to claim 18, wherein
the plurality of memory blocks in the non-volatile memory includes a first plurality of memory blocks associated with a first stream and a second plurality of memory blocks associated with a second stream, and
the input block and the active block are both associated with the first stream.

20. The method according to claim 11, wherein
the non-volatile memory includes a first memory chip and a second memory chip, and
the target physical location is a physical location in the first memory chip, and the destination physical location is a physical location in the second memory chip.

* * * * *